(12) United States Patent
Wezelenburg et al.

(10) Patent No.: US 7,924,858 B2
(45) Date of Patent: Apr. 12, 2011

(54) USE OF A DATA ENGINE WITHIN A DATA PROCESSING APPARATUS

(75) Inventors: Martinus Cornelius Wezelenburg, Kessel-Lo (BE); Johan Matterne, Landen (BE); Dirk Duerinckx, Wilsele (BE); Sven Wambecq, Kessel-Lo (BE)

(73) Assignee: ARM Limited, Cambridge (GB)

( * ) Notice: Subject to any disclaimer, the term of this patent is extended or adjusted under 35 U.S.C. 154(b) by 1304 days.

(21) Appl. No.: 11/403,201

(22) Filed: Apr. 13, 2006

(65) Prior Publication Data

US 2006/0271712 A1 Nov. 30, 2006

Related U.S. Application Data

(63) Continuation-in-part of application No. 11/121,185, filed on May 4, 2005, now Pat. No. 7,630,388.

(30) Foreign Application Priority Data

Oct. 3, 2005 (EP) .................................... 05256176

(51) Int. Cl.
*H04L 12/28* (2006.01)
*G06F 3/00* (2006.01)
*G06F 15/00* (2006.01)

(52) U.S. Cl. .............................. 370/412; 710/52; 712/28

(58) Field of Classification Search .................. 370/412, 370/415, 419; 710/52–54, 58, 59, 61; 712/28–31; 718/100, 102–104
See application file for complete search history.

(56) References Cited

U.S. PATENT DOCUMENTS 5,440,740 A * 8/1995 Chen et al. .................... 718/104

(Continued)

FOREIGN PATENT DOCUMENTS

DE 103 23 189 12/2004

(Continued)

OTHER PUBLICATIONS

H. Igura et al, "An 800-MOPS, 11-mW, 1.5-V, Parallel DSP for Mobile Multimedia Processing" *IEEE Journal of Solid-State Circuits*, vol. 33, No. 11, Nov. 1998, pp. 1820-1828.

(Continued)

*Primary Examiner* — Aung S Moe
*Assistant Examiner* — Kerri M Rose
(74) *Attorney, Agent, or Firm* — Nixon & Vanderhye P.C.

(57) ABSTRACT

A data processing apparatus and method of operation of such a data processing apparatus are disclosed. The data processing apparatus has a main processing unit operable to perform a plurality of data processing tasks, and a data engine for performing a number of those tasks on behalf of the main processing unit. At least one shared resource is allocatable to the data engine by the main processing unit for use by the data engine when performing data processing tasks on behalf of the main processing unit. The data engine comprises a data engine core for performing the tasks, and a data engine subsystem configurable by the main processing unit and arranged to manage communication between the data engine core and an allocated shared resource. The data engine core comprises a resource manager unit for acting as a master device with respect to the data engine subsystem in order to manage use of the allocated shared resource. It has been found that such an approach provides a particularly efficient implementation of a data engine within a data processing apparatus, which reduces the need for re-writing of existing code to enable it to be executed on such a data processing apparatus.

19 Claims, 10 Drawing Sheets

U.S. PATENT DOCUMENTS

| | | | |
|---|---|---|---|
| 5,602,995 A | 2/1997 | Hendel et al. | |
| 5,623,619 A | 4/1997 | Witt | |
| 5,748,468 A | 5/1998 | Notenboom et al. | |
| 5,752,069 A | 5/1998 | Roberts et al. | |
| 5,860,104 A | 1/1999 | Witt et al. | |
| 6,055,579 A * | 4/2000 | Goyal et al. | 712/28 |
| 6,574,273 B1 | 6/2003 | Luna et al. | |
| 6,625,639 B1 * | 9/2003 | Miller et al. | 718/106 |
| 6,625,654 B1 * | 9/2003 | Wolrich et al. | 718/102 |
| 6,643,716 B2 | 11/2003 | Hunsaker | |
| 6,934,951 B2 * | 8/2005 | Wilkinson et al. | 718/107 |
| 6,983,350 B1 * | 1/2006 | Wheeler et al. | 710/52 |
| 6,999,994 B1 * | 2/2006 | Benayoun et al. | 718/100 |
| 7,233,331 B2 * | 6/2007 | Kato | 718/102 |
| 7,389,508 B2 * | 6/2008 | Aguilar et al. | 718/104 |
| 7,478,390 B2 * | 1/2009 | Brokenshire et al. | 718/100 |
| 2004/0025159 A1 * | 2/2004 | Scheuermann et al. | 718/100 |
| 2005/0036557 A1 | 2/2005 | Balakrishnan et al. | |
| 2005/0122986 A1 * | 6/2005 | Starr et al. | 370/412 |

FOREIGN PATENT DOCUMENTS

| | | |
|---|---|---|
| EP | 0 945 788 | 9/1999 |
| JP | 11-272631 | 10/1999 |

OTHER PUBLICATIONS

J. Watlington et al, "A System for Parallel Media Processing" *Parallel Computing*, vol. 23, No. 12, 1997, pp. 1793-1809.

English translation of Official Action mailed Dec. 2, 2008 in corresponding Japanese Application No. 2006-124134.

PCT International Search Report mailed Jul. 26, 2006.

* cited by examiner

USE OF A DATA ENGINE WITHIN A DATA PROCESSING APPARATUS

CROSS REFERENCE TO RELATED APPLICATIONS

This application is a Continuation-In-Part of U.S. application Ser. No. 11/121,185, filed 4 May 2005 (now U.S. Pat. No. 7,630,388) and claims priority to EP Application No. 05256176.8 filed 3 Oct. 2005. The entire contents of these applications are incorporated herein by reference.

Related co-pending U.S. patent application Ser. No. 11/402,192, filed Apr. 12, 2006, Matterne et al, is commonly owned and herein incorporated by reference.

BACKGROUND OF THE INVENTION

1. Field of the Invention

The present invention relates to a data processing apparatus and method, and in particular to use of a data engine within such a data processing apparatus.

2. Background of the Invention

In a data processing apparatus having a main processing unit, it is known to provide a data engine, sometimes also referred to as a loosely-coupled coprocessor (loosely coupled in the sense that it resides externally to the main processing unit and that synchronisation between the data engine and the main processing unit only takes place on a process or task level), which can be used to handle certain data processing tasks on behalf of the main processing unit. This can lead to various improvements with respect to a data processing apparatus where all of the tasks are handled by the main processing unit, these improvements being for example one or more of an increase in speed of execution, a reduction in power consumption for a given set of tasks, or a decrease in the total silicon area required to support the required functionality.

One example of such a data engine is a Digital Signal Processor (DSP), which can be considered to be a processing unit optimised for handling specific processing tasks and which typically has its own dedicated resources, for example its own interrupt controller, its own Direct Memory Access (DMA) logic, etc. Whilst the use of such DSPs can be very effective in improving performance of the data processing apparatus, they are expensive to provide within a data processing apparatus, due to the need to provide the DSP with all of the dedicated resources needed to enable the DSP to perform the required processing task on behalf of the main processing unit.

An alternative to such DSPs is to provide a data engine of the type that has no local resources dedicated to it, such a data engine acting as a pure slave device for the main processing unit. In such examples, the main processing unit dispatches a particular task to the data engine, along with all the data required by the data engine to perform that task, and subsequently receives a confirmation signal from the data engine when that task has been completed. On receipt of such a confirmation signal, a further task can then be dispatched from the main processing unit to the data engine. Whilst such a data engine can be significantly cheaper to implement than the earlier-mentioned DSP, due to the fact that it requires no local resources to be provided for the data engine, there is significant overhead on behalf of the main processing unit in handling the allocation of individual tasks to the data engine, and ensuring that the data engine is provided with all the data it needs to perform the task, thereby resulting in significant global system activity to support the data engine's activities. This not only deteriorates performance in terms of compute cycles and power consumption, but also often results in the need to significantly re-write existing software to enable that software to be run on a data processing apparatus including such a data engine, which is clearly undesirable.

A middle ground approach that has been developed between the above described DSP approach, where all resources required by the DSP are provided locally to the DSP and dedicated to the DSP, and the data engine approach where the data engine has no local/dedicated resources, is to provide a data engine which can have access to certain resources, but those resources are shared with other elements of the data processing apparatus. Hence, whilst those resources, or portions of those resources, may be dedicated to the data engine for a particular session (a session typically containing a group of tasks to be performed), those resources can be re-allocated in a subsequent session to other elements of the data processing apparatus.

When providing a data engine with access to certain shared resources, a subsystem layer can be provided between the main processing unit and the data engine to provide some decoupling of the data engine from the main processing unit. The main processing unit can then allocate a group of tasks to the data engine, and the subsystem then handles the dispatch of each individual task to the data engine for handling. The subsystem can also cause the allocated shared resources to be accessed as and when required to enable the data engine to perform the required tasks. In such an approach, the subsystem adopts a master role with respect to the data engine, and the data engine again acts as a pure slave. Whilst such an approach can remove some of the task management complexities from the main processing unit, by allowing the main processing unit to dispatch a group of tasks to the subsystem for handling by the data engine, it still will often require a significant re-writing of existing software to enable that software to execute on the data processing apparatus. In particular, when the software implementing a particular task was written, it may have been assumed that such a task would be performed by a processing unit that was able to exhibit some master functionality, and hence could initiate certain events. However, as discussed above, when a task is allocated to the data engine by the subsystem, the data engine itself acts as a pure slave device, and cannot initiate any events.

A further problem with the approach described above is that it presents three different program points of view within the system. In particular, in addition to requiring the main processing unit and the data engine to be programmed, the subsystem also requires some programming, since it acts like a local processing unit in its own right, due to the requirement for it to manage the dispatch of individual tasks to the data engine, and manage the access to the shared resources as required in order to ensure that the data engine is provided with all the data it requires to perform such tasks. Further, it does not help in reducing global system activity, since use of the shared resources requires significant communication with the main processing unit.

Accordingly, it would be desirable to provide an improved data engine for use within a data processing apparatus, that can provide significant cost savings with respect to the use of a DSP, and which can reduce the risks of having to significantly re-write software to enable it to run on a system including that data engine.

SUMMARY OF THE INVENTION

Viewed from a first aspect, the present invention provides a data processing apparatus comprising: a main processing unit operable to perform a plurality of data processing tasks; a data engine operable to perform a number of said data processing tasks on behalf of the main processing unit; at least one shared resource allocatable to the data engine by the main processing unit for use by the data engine when performing said number of data processing tasks; the data engine comprising a data engine core operable to perform said number of data processing tasks, and a data engine subsystem configurable by the main processing unit and operable to manage communication between the data engine core and an allocated shared resource; the data engine core comprising a resource manager unit operable to act as a master device with respect to the data engine subsystem to manage use of the allocated shared resource.

In accordance with the present invention, the data engine has a data engine core for performing tasks on behalf of the main processing unit, and a data engine subsystem which is configurable by the main processing unit, and is arranged to manage communication between the data engine core and an allocated shared resource, the allocated shared resource being a resource which has been allocated to the data engine by the main processing unit for use by the data engine when performing the tasks.

The entirety of the shared resource may be allocated to the data engine for some period, typically a session, or instead only a portion of the resource may be allocated with other portions being allocated to other elements of the data processing apparatus. Where a portion of a resource is allocated to the data engine, that portion may be a physical portion, for example a region of memory, a limited number of channels of a DMA controller, etc, or may be a functional portion identifying a particular subset of the functionality supported by the shared resource, for example allowing the data engine read access but no write access. Hence, a shared resource can either be dedicated to the data engine for a period, or can be shared between the data engine and other elements (which may for example also be data engines) during that period, but in the latter case the data engine is typically only allocated access to a physical or functional portion that does not conflict with physical or functional portions allocated to the other elements.

Furthermore, in accordance with the present invention, the data engine core has a resource manager unit which acts as a master device with respect to the data engine subsystem in order to manage use of the allocated shared resource. By such an approach, the data engine core is able to perform a variety of different actions that existing software may have expected the processing unit executing that software to have the capability to perform. This can significantly reduce the extent to which existing software needs to be re-written in order to enable it to be executed on a data processing apparatus including such a data engine. Furthermore, since access to the shared resources is tightly integrated in the data engine via the resource manager unit, these resources can be less costly than a resource that has to function on its own.

Additionally, by providing the resource manager unit within the data engine core to act as a master device with respect to the data engine subsystem, this can alleviate the requirement to separately program the data engine subsystem, and accordingly can reduce the number of program points of view that might otherwise be present, thereby significantly reducing the complexity of the design. The resource manager unit may be formed as a hardware unit, or alternatively may be formed as a mixture of hardware and software elements.

The shared resource may be shared with any other elements of the data processing apparatus, for example the main processing unit, or any further data engines provided within the data processing apparatus. In one embodiment, multiple data engines may use the same data engine subsystem and in that case the shared resource may actually reside within the data engine subsystem. Typically, the main processing unit will be arranged to configure the data engine subsystem and allocate any required shared resources to the data engine, on a session-by-session basis, where each session will typically comprise a plurality of tasks to be performed on the data processing apparatus. Hence, for the duration of the session, the configuration of the data engine subsystem will not change, and the allocation of the shared resources will not change. However, the resource manager unit can be used to manage the way in which the allocated shared resources are used during the session.

The provision of the resource manager unit within the data engine to act as a master device with respect to the data engine subsystem allows the data engine access during the session to the shared resources without intervention from/interaction with the main processing unit, thereby reducing global system activity and hence producing performance improvements and reducing energy consumption. For example, the reduction in global system activity can increase the likelihood of the main processing unit being able to adopt a low power mode for more proportion of the time.

The main processing unit can take a variety of forms. For example, it may be a central processing unit (CPU), or alternatively may be some other simplified control element within the data processing apparatus, for example a control element which merely controls boot up, and then delegates all other tasks to one or more data engines.

There are a number of ways in which the resource manager unit can act as a master device to manage use of the allocated shared resource. In one embodiment, the number of data processing tasks to be performed by the data engine comprise a sequence of instructions, including at least one instruction of an instruction set executable by the data engine core to cause said resource manager unit to act as said master device, upon execution of said at least one instruction the resource manager unit being operable to issue a control command to the data engine subsystem to thereby manage use of the allocated shared resource. Hence, in accordance with such embodiments, the data engine subsystem is caused to manage use of the allocated shared resource in the desired manner through the issuance of control commands from the resource manager unit to the data engine subsystem.

In one particular embodiment, the data engine subsystem comprises control logic operable to receive the control command from the resource manager unit and to control use of the allocated shared resource dependent on that control command. In one embodiment, the control logic within the data engine subsystem will comprise three interfaces, the first interface being a configuration interface through which the operation of the control logic can be configured by the main processing unit, the second interface being a control interface via which communications between the resource manager unit of the data engine core and the control logic of the data engine subsystem can take place, and the third interface being an interface between the control logic and the parts of the data processing apparatus external to the data engine, via which the control logic can bring about the management of the allocated shared resource as dictated by the resource manager unit.

The instructions provided within the instruction set executable by the data engine core can take a variety of forms. In one embodiment, the instruction set executable by the data engine core comprises at least one transfer initiation instruction which when executed causes the resource manager unit to act as said master device. Hence, in such embodiments, execution of the transfer initiation instruction will cause an appropriate control command to be issued to the data engine subsystem to initiate some operation, for example the transfer of some data, the issuance of an interrupt signal to an interrupt controller, the reprogramming of an allocated region of memory, etc.

In one embodiment, the allocated shared resource and the data engine core operate concurrently with each other, and the instruction set executable by the data engine core comprises at least one synchronisation instruction which when executed causes a synchronisation to occur between the allocated shared resource and the data engine core. Since the allocated shared resource operates concurrently with respect to the data engine, both the allocated shared resource and the data engine can be performing, at any particular point in time, operations independently of each other, but without knowledge of each other's state. The use of a synchronisation instruction hence allows a synchronisation point to be reached where synchronisation between the allocated shared resource and the data engine take place. This is beneficial, since it will often be the case that points will be reached within program code, where the next instruction cannot execute until such synchronisation is in place.

As mentioned previously, the main processing unit can change the configuration of the data engine subsystem at certain points in time, typically when switching to a new session. However, any such change to the configuration implies a reset of various parts of the data processing apparatus which have operated in dependence on the current configuration. In a typical embodiment, it will be important to ensure that such a process is handled carefully, and in particular it may be important to ensure that the data engine core and the allocated shared resource are synchronised prior to such a change taking place. Accordingly, in one embodiment, when the main processing unit indicates a new configuration for the data engine subsystem, the data engine core is operable to execute one of said synchronisation instructions in order to cause a synchronisation point to be reached where the allocated shared resource and the data engine are synchronised, and the new configuration is only effected within the data engine subsystem after the synchronisation point is reached.

The data engine core can be arranged in a variety of ways. However, in one embodiment the data engine core comprises data path logic consisting of a plurality of functional units, one of said functional units being the resource manager unit, the data engine core further comprising a controller operable to control, for each instruction in the sequence, which functional unit acts upon that instruction. Hence, in accordance with such embodiments, multiple functional units can be provided within the data engine core, with each functional unit being used to act upon particular types of instructions in order to provide fast and efficient processing of those instructions, with a controller being used to ensure that the individual instructions of an instruction sequence are acted upon by the appropriate functional units. In one embodiment each instruction is executed by the controller to produce control signals to be routed to the appropriate functional unit, whilst in an alternative embodiment the controller may merely route each instruction to the appropriate functional unit for execution by that functional unit.

In one embodiment, a data engine compiler is provided for scheduling the sequence of instructions to be executed by the data engine core. The aim of the compiler is to ensure that the sequence of instructions are executed in as efficient a manner as possible having regard to the structure of the data engine core. In accordance with one embodiment of the present invention, the instruction set executable by the data engine core comprises at least one bound instruction identifying a bound condition, the compiler being operable, on encountering one of said bound instructions, to schedule execution of subsequent instructions in the sequence having regard to the bound condition. As an example, the bound instruction may identify a group of addresses that are to be subjected to a DMA procedure, and the compiler may be operable to schedule as the instructions immediately following that bound instruction instructions which do not require access to those group of addresses.

It should be noted that in some embodiments the bound condition specified by a bound instruction can also be used in other ways, to ensure efficient processing by the data engine core. For example, in one embodiment, the bound condition can be conveyed from the resource manager unit to the control logic of the data engine subsystem in order to set a semaphore which will cause the data engine core to stall if it requires any access to addresses within the address range specified by the bound condition. When the bound condition is no longer required, the semaphore can be cleared, thereby allowing the data engine core to continue with the access that had caused it to stall.

The resource manager unit can be used in a variety of ways. In accordance with one embodiment, the resource manager unit is operable as a data transfer controller synchronised with the data engine. Hence, by way of example, when acting as a master device, the resource manager unit will act as a data transfer initiating device, and in addition if used as a slave device, the resource manager unit can act as a data gate device.

In one embodiment, the allocated shared resource comprises DMA logic, and the resource manager unit is operable to act as a DMA master device to initiate a transfer of data using said DMA logic. Accordingly, in such embodiments, the resource manager unit of the data engine core is able to initiate data transfers of its own volition, as and when they are required as a result of the tasks being executed by the data engine on behalf of the main processing unit. Such data transfers may involve the transfer of data into the data engine, or the transfer of data out of the data engine.

In one embodiment, the allocated shared resource comprises an interrupt controller, and the resource manager unit is operable to issue an interrupt for routing via the data engine subsystem to the interrupt controller. Hence, this enables interrupt-based processing to be performed directly by the data engine core, and hence when the data engine needs to send a signal to another device, the resource manager unit can cause an appropriate interrupt signal to be issued.

In one embodiment, the allocated shared resource comprises a region of memory, and the resource manager unit is operable to issue control signals for initiating a change of use of one or more portions of that region of memory. Hence, within a particular session, this enables the data engine to optimise the use of the allocated memory resource having regard to the tasks being executed.

In embodiments where the allocated shared resource comprises a region of memory, the instruction set executable by the data engine core may comprise at least one management instruction to enable dynamic runtime management of the region of memory. Hence, by way of example, part of the region of memory may be used to implement a software FIFO structure defined by a head pointer and a tail pointer, and the management instruction may perform dynamic runtime management of that software FIFO, for example by querying the head pointer, setting the tail pointer, configuring the software FIFO, etc.

In one embodiment, the instruction set executable by the data engine core comprises at least one scheduling instruction which when executed causes a task to be scheduled for execution by the allocated shared resource. This may for example be appropriate if the resources required to execute the task are not immediately available, and in such instances the task can be queued for execution when the resources become available.

In one embodiment, the instruction set executable by the data engine core comprises at least one registering instruction which when executed whilst the data engine core is performing a first data processing task causes a second data processing task to be registered for execution. By such an approach, the resource manager unit in one embodiment provides an interface that allows one task to register subsequent tasks with some scheduling routine, for example the scheduler part of the operating system.

In one embodiment the instruction set executable by the data engine core comprises at least one callback instruction, if the data engine core determines whilst performing a first data processing task that at least one condition for performance of that task is not satisfied, the data engine core being operable to execute the callback instruction to cause the resource manager unit to identify to the data engine subsystem that the first data processing task should be re-invoked once said at least one condition is satisfied, thereby allowing the data engine core to terminate execution of the first processing task until the at least one condition is satisfied. Hence, through such embodiments, the data engine core can decide to terminate execution of a particular task if a certain condition is not satisfied, with the resource manager unit then providing a mechanism for advising the data engine subsystem that the task should be re-invoked at some later point when the condition is satisfied. This approach hence supports flexibility in how tasks are executed by the data engine core, without needing to add any scheduling complexity to the data engine core itself.

In one embodiment, the data engine comprises a stub layer which when a data processing task is to be performed by the data engine core is operable to check for one or more prerequisites required by that data processing task before allowing the data processing task to be performed by the data engine core. Such prerequisites may for example be the availability of certain program data, constant table data, state allocations, etc. Through the use of such a stub layer a more generalised task model can be implemented on the data engine, where instead of merely executing a task, certain checking procedures can first be invoked.

In one such embodiment the instruction set executable by the data engine core comprises at least one request instruction, and when the stub layer determines that at least one prerequisite required by the data processing task is not satisfied, the request instruction is executed to cause the resource manager unit to output a request command to the data engine subsystem asking for that at least one prerequisite to be satisfied. By such an approach, the actual execution of the task by the data engine core can be deferred until the at least one prerequisite is satisfied.

In one embodiment, the instruction set executable by the data engine core comprises at least one error handling instruction, when at least one prerequisite required by the data processing task cannot be satisfied the error handling instruction being executed to cause the resource manager unit to output any required error condition and cause the data processing task to be exited. In embodiments using the earlier mentioned stub layer, the execution of the error handling instruction can be arranged to cause an exit command to be issued from the resource manager unit to the stub layer to cause an exit routine to be executed.

In the above discussions, the instruction set executable by the data engine core has been described as including a variety of different types of instructions, and in particular has been described as including transfer initiation instructions, synchronisation instructions, bound instructions, scheduling instructions, registering instructions, callback instructions, request instructions and error handling instructions. It should be noted that any particular instruction may belong to more than one of these instruction types. For example, a transfer initiation instruction may also be a bound instruction. For example, a DMA start instruction may define a range of addresses to be subjected to the DMA operation. As another example, a transfer initiation instruction may be considered to be a scheduling instruction in situations where the resources required to implement the task identified by the instruction are not currently available.

From the above description, it will be appreciated that the allocated shared resource can take a variety of forms. In one embodiment, the allocated shared resource is an element of the data processing apparatus facilitating communication between the data engine and a processing unit of the data processing apparatus. The processing unit with which the allocated shared resource facilitates communication with the data engine may take a variety of forms, and hence for example may be the main processing unit, or some other processing unit within the data processing apparatus, such as for example another data engine.

The instructions of the instruction set executable by the data engine core can take a variety of forms. However, in one embodiment, at least one instruction in the instruction set executable by the data engine core is arranged to cause the return of a flag to indicate if the instruction was executed successfully, whereby in the absence of the flag the data engine core will stall and enter a power saving mode. Hence in accordance with such an embodiment, the instruction is seen as returning unconditionally from the data engine core's perspective, such that the data engine core stalls in the absence of the return flag. This provides a particularly power efficient implementation within the data engine, by enabling the data engine core to automatically stall and enter a power saving mode in the absence of a flag being returned.

In one embodiment, some instructions will be blocking and will issue a stall until they have finished, these being instructions which will cause the return of a flag. Other instructions will be non-blocking, such non-blocking instructions either implementing an action that is guaranteed to finish in a fixed number of cycles (for example when requesting status info), or starting an action for which the data engine core does not need to know a result, or the result is not needed immediately (for example when a second command will be used to do the synchronization).

Viewed from a second aspect, the present invention provides a method of operating a data processing apparatus having a main processing unit operable to perform a plurality of data processing tasks, and a data engine operable to perform a number of said data processing tasks on behalf of the main processing unit, the method comprising the steps of: allocating to the data engine at least one shared resource for use by the data engine when performing said number of data processing tasks; performing said number of data processing tasks using a data engine core of the data engine; configuring a data engine subsystem used to manage communication between the data engine core and the allocated shared resource; and employing a resource manager unit within the data engine core to act as a master device with respect to the data engine subsystem to manage use of the allocated shared resource.

Viewed from a third aspect, the present invention provides a data engine for a data processing apparatus having a main processing unit operable to perform a plurality of data processing tasks, the data engine being operable to perform a number of said data processing tasks on behalf of the main processing unit, and being allocated at least one shared resource of the data processing apparatus for use when performing said number of data processing tasks, the data engine comprising: a data engine core operable to perform said number of data processing tasks; a data engine subsystem configurable by the main processing unit and operable to manage communication between the data engine core and the allocated shared resource; and a resource manager unit within the data engine core operable to act as a master device with respect to the data engine subsystem to manage use of the allocated shared resource.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
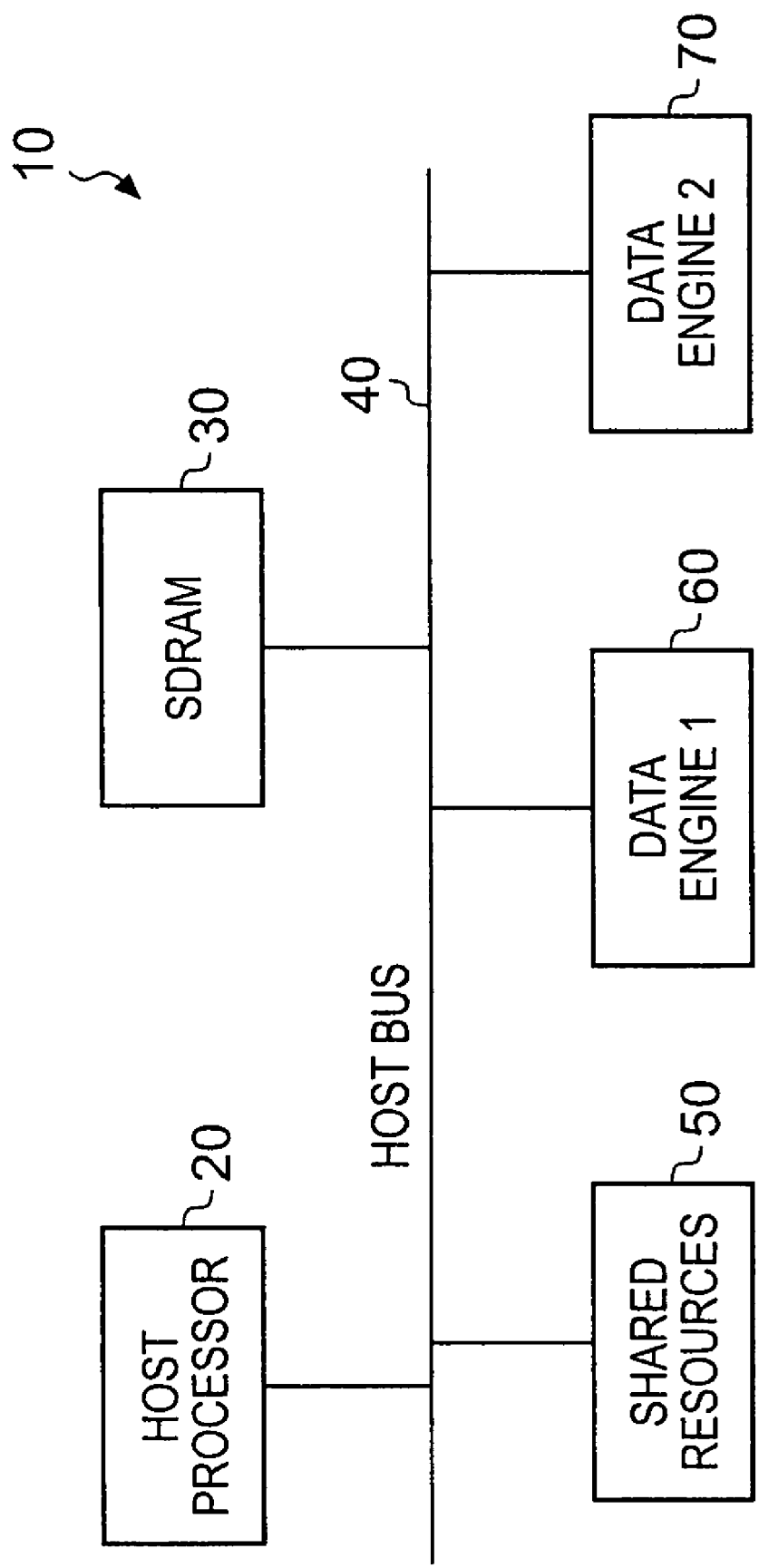
FIG. 1 is a block diagram of a data processing apparatus in accordance with one embodiment of the present invention.

FIG. 1 is a block diagram of a data processing apparatus in accordance with one embodiment of the present invention. The data processing apparatus 10 has a host processor 20 which can communicate via a host bus 40 (which may in fact constitute a network of separate buses) with a variety of other devices connected to the host bus. In particular, a memory device, such as SDRAM 30, can be provided for storing data required by the host processor. Similarly, one or more data engines 60, 70 may be provided for performing certain tasks on behalf of the host processor 20. In addition, one or more shared resources 50 may be provided which can be allocated by the host processor 20 to one or both of the data engines 60, 70 for use by that data engine when performing tasks on behalf of the host processor 20.

The shared resources 50 can take a variety of forms and may consist of one or more separate resources. Examples of such shared resources are, without limitation, a DMA logic unit for managing data transfers, a vectored interrupt controller (VIC) for handling interrupt requests, a region of memory, a communication exchange element for facilitating communication between a data engine 60, 70 and some other element of the data processing apparatus 10, for example the host processor 20 or another data engine, etc.

In accordance with the embodiments of the present invention, at least one of the data engines 60, 70 is a data engine which has a data engine core for performing the data processing task, and a data engine subsystem configurable by the main processing unit and arranged to manage communication between the data engine core and an allocated shared resource. An application being run on the data processing apparatus will typically consist of a number of separate sessions, and for each session the host processor 20 is arranged to configure the data engine subsystem and to allocate one or more of the shared resources for use by the data engine during that session. The data engine core will in one embodiment be configured via control logic within the data engine subsystem, or alternatively may be configured via a stub layer provided within the data engine, the stub layer being described in more detail later with reference to FIG. 9.

If both of the data engines 60, 70 are data engines of the type described above, then each data engine will have its own data engine core. In one embodiment, each data engine will also have its own data engine subsystem, but it should be noted that in alternative embodiments the data engines 60, 70 may share a data engine subsystem.

Figure 2:
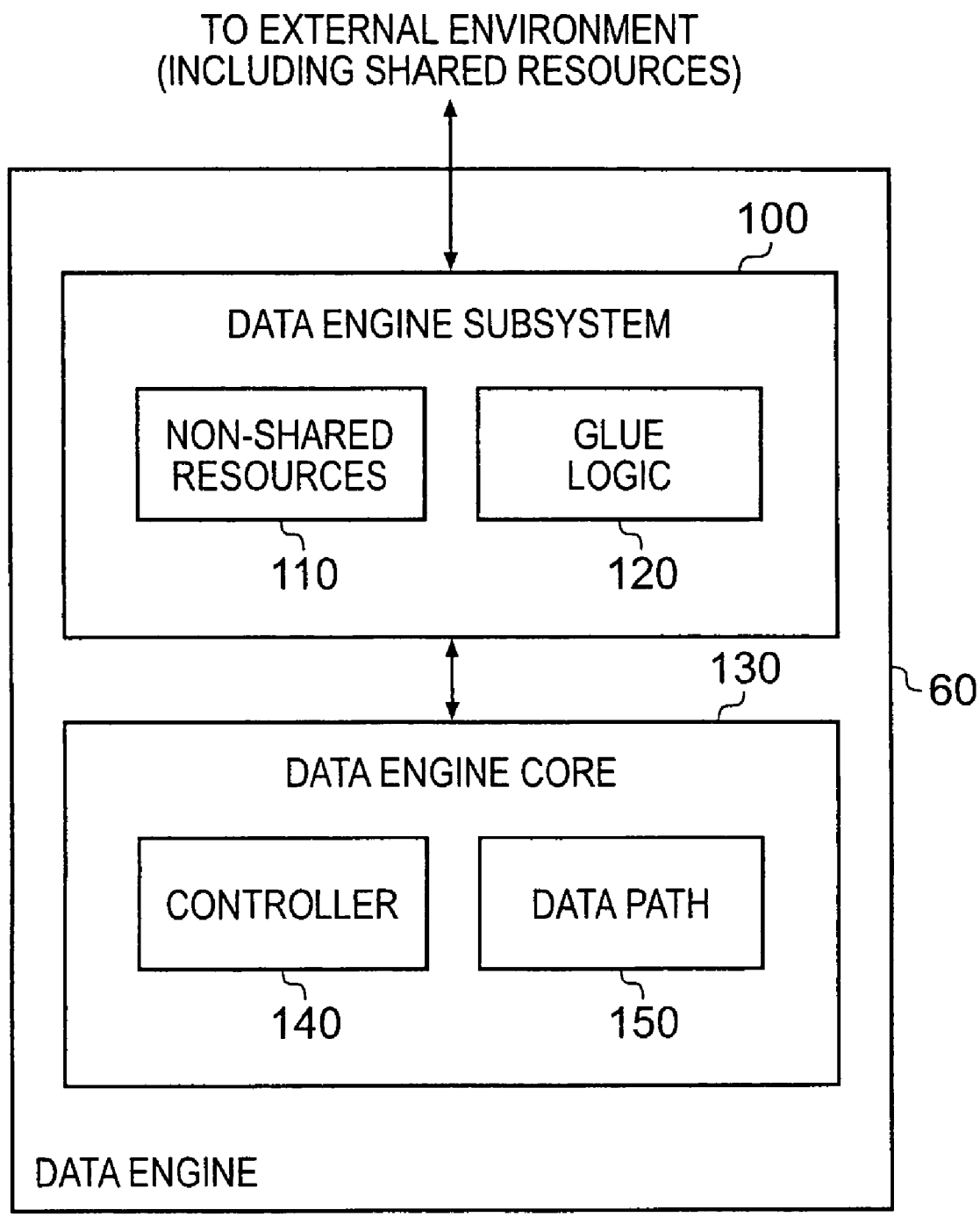
FIG. 2 is a block diagram illustrating in more detail the elements provided within at least one of the data engines of FIG. 1 in accordance with one embodiment of the present invention.

FIG. 2 is a block diagram illustrating in more detail the logic provided within at least one of the data engines 60, 70 in accordance with one embodiment of the present invention. In particular, in one embodiment, it is assumed that at least data engine 60 is of the above described type, and accordingly contains a data engine subsystem 100 and a data engine core 130. The data engine core has a data path 150 which will typically include a number of functional units for acting in response to instructions constituting the tasks being handled by the data engine. The controller 140 within the data engine core 130 is responsible for ensuring that the individual instructions of an instruction sequence are acted upon by the appropriate functional units within the data path 150.

The data engine core 130 communicates with the external environment, i.e. those parts of the data processing apparatus 10 external to the data engine 60 and hence in particular including the shared resources 50, via the data engine subsystem 100. As mentioned earlier, the data engine subsystem is configured by the main processing unit on a session-by-session basis and is arranged to manage communication between the data engine core and the allocated shared resources. In particular, the data engine subsystem 100 includes glue logic 120 which is configured by the host processor 20 to allow appropriate communication between the data engine core 130 and the external environment, including the shared resources 50.

In addition to the glue logic 120, the data engine subsystem 100 can include one or more non-shared resources 110, these being resources which are dedicated to a data engine core connected to that data engine subsystem 100. An example of such non-shared resources may be a portion of memory specifically dedicated to a data engine 60.

Figure 3:
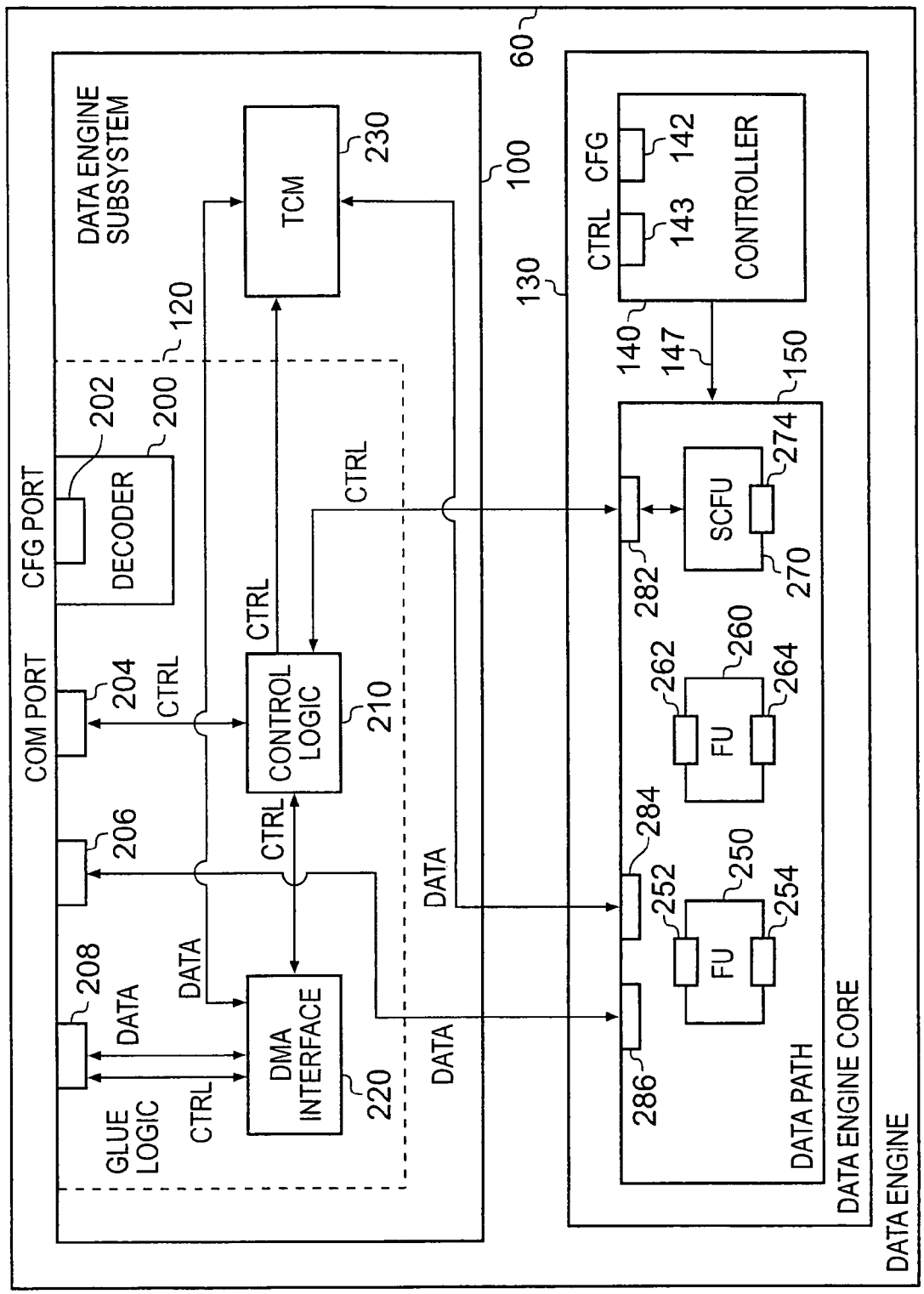
FIG. 3 is a block diagram illustrating in more detail the components provided within at least one of the data engines of FIG. 1 in accordance with one embodiment of the present invention.

FIG. 3 is a block diagram illustrating in more detail the elements provided within the data engine 60, and optionally the data engine 70, in accordance with one embodiment of the present invention. As shown in the example of FIG. 3, a non-shared resource in the form of a Tightly Coupled Memory (TCM) 230 is provided within the data engine subsystem 100, this TCM 230 being dedicated to the data engine core 130.

The glue logic 120 actually consists of a number of components. In particular, the glue logic 120 includes a decoder 200 which is connected to a configuration port 202 by which the decoder receives configuration setting information from the host processor 20. The decoder 200 will decode this configuration setting information, in order to cause appropriate control signals to be sent to the other elements of the data engine subsystem 100 in order to cause the required configuration of the data engine subsystem to take place.

The glue logic 120 also includes control logic 210 which can issue control signals to various other components within the data engine subsystem 100, and also to elements of the external environment via the communications port 204 of the data engine subsystem. In addition, in accordance with one embodiment of the present invention, the control logic 210 is coupled to a resource manager unit 270 provided within the data path 150 of the data engine core 130, this resource manager unit also being referred to herein as a system-call functional unit (SCFU). The SCFU 270 can act as a master device with respect to the data engine subsystem 100 in order to allow the data engine core 130 to initiate synchronisation, control transaction and data transfers between the data engine core 130 and the external environment, including any allocated shared resources 50. In particular, a set of instructions are provided which can be acted upon by the SCFU 270 in order to cause corresponding control commands to be issued from the SCFU 270 to the control logic 210 within the data engine subsystem 100 in order to cause the required functions to take place. A communications port 282 is provided within the data path 150 via which the SCFU 270 can communicate with the control logic 210, and by which the control logic 210 can communicate with the SCFU 270. The SCFU 270 also has an input/output port 274 through which communications between the controller 140 and the SCFU 270 can take place.

Hence, the SCFU 270 can be viewed as an interface that allows the data engine core 130 to make its intentions known through the issuance of messages to the data engine subsystem 100. Similarly, the host processor 20 can make its intentions known (e.g. it would like to change a session). The sub-system control logic 210 then combines this information and takes the appropriate action, as will be discussed in more detail later by way of example with reference to the transaction diagrams of FIGS. 5 to 9.

The data engine subsystem 100 of the example of FIG. 3 also includes a DMA interface 220 which is coupled to a data port 208, via which DMA transactions can take place between the data engine subsystem 100 and the external environment.

The TCM 230 as shown in FIG. 3 will actually consist of the TCM itself and the associated control logic provided in association with the TCM, for example to arbitrate between multiple requests for access to the TCM. The control logic 210 can issue control signals to the TCM control logic to configure the TCM 230 as required.

In addition to the SCFU 270, the data path 150 also includes a plurality of functional units 250, 260, and each functional unit can be considered to have two interfaces 252, 254 and 262, 264, respectively. Both of these interfaces are visible from the data path 150, and hence the properties of these interfaces are known by a data engine compiler (not shown) used to compile instructions for processing by the data path 150. In contrast, it should be noted that the SCFU 270 has one interface 274 which is visible from the data path 150, and hence is known to the compiler, but its other interface is the communications port 282 which is visible from the data engine subsystem 100, and thus invisible to the compiler. It should be noted that the SCFU 270 can also optionally be provided with a third interface (not shown) to the external environment, over which functionality assigned to the SCFU can be configured. This optional third interface can for example be a service access protocol (SAP) interface.

As also shown in FIG. 3, a number of data ports 284, 286 can be provided within the data path 150 via which the functional units 250, 260 can receive data from, and output data to, other elements of the data processing apparatus via the data engine subsystem 100. In one embodiment, each of these data interfaces 284, 286 can be used by each of the functional units 250, 260. In the particular example illustrated in FIG. 3, one data port 284 is coupled to the TCM 230 to enable data to be exchanged between the functional units 250, 260 and the TCM 230, whilst another data port 286 is coupled through the data engine subsystem 100 to the data port 206 of the data engine subsystem, to allow data to be communicated between the data engine core 130 and memory forming a shared resource within the external environment.

The SCFU 270 can be operated through a set of instructions that are an integral part of the data engine architecture (i.e. the whole of the data engine capabilities/instruction set). In one embodiment, those SCFU specific instructions are constrained to be modelled as a standard OSI (Open Systems Interconnection) layer or common OS (Operating System) calls. By such an approach, the software porting effort when adapting software to run on a data processing apparatus including such a data engine can be significantly reduced.

As discussed earlier, the SCFU 270 within the data path 150 can act as a master device with respect to the data engine subsystem 100 to manage use of any allocated shared resources 50 allocated to the data engine 60 by the host processor 20. In one example of such use, the SCFU 270 can act as a data transfer controller synchronised with the data engine core 130. As an example, if an allocated shared resource comprises DMA logic, the SCFU 270 can act as a DMA master device to initiate a transfer of data using that DMA logic. In particular, the controller 140 can execute an instruction in order to issue control signals to the SCFU 270 over path 147 and via the port 274 to cause a control command to be issued via the communication port 282 to the control logic 210 to seek to run a DMA transfer process. This will result in the control logic 210 sending an appropriate control signal to the DMA interface 220 to cause a transfer request to be output by the DMA interface 220 via the data port 208 to the DMA logic provided externally to the data engine 60. This will initiate a DMA transfer of data via the DMA logic. In one example, the data may be transferred from some external memory into the TCM 230 within the data engine subsystem 100, so that it can be quickly accessed by the data path 150 of the data engine core 130. In this example the data will be routed from the DMA logic via the data port 208 to the DMA interface 220, from where that data will then be routed from the DMA interface 220 to the TCM 230 for storage therein. The stored data can then subsequently be accessed by the data path 150 through the data port 284 coupling the data path 150 with the TCM 230.

As another example of functionality that may be implemented through use of the SCFU 270, the controller 140 can cause the SCFU 270 to issue a control command to the control logic 210 to cause an interrupt request to be output via the communications port 204 to a shared resource in the form of a vectored interrupt controller (VIC). This mechanism hence allows interrupt driven processing to be implemented efficiently by the data engine core 130, whereas previously such a data engine core 130 would only be able to act as a slave style device, and accordingly would not be able to issue interrupts of its own volition.

In another example, the shared resource may take the form of a region of memory shared between the data engine core 130 and some other element of the data processing apparatus. In such examples, although the particular region of memory allocated to the data engine 60 will have been fixed by the host processor 20 for the duration of the session, the SCFU 270 can be used to alter the way in which that region of memory is used during the session in question. In particular, an instruction can be executed which causes the SCFU 270 to route a control signal via the control logic 210 and the communication port 204 to the memory controller of the memory region in question to implement the required change of use of that region of memory.

It should be noted that in embodiments where the data engine subsystem 100 is shared between multiple data engine cores 130, then the TCM 230 can itself be considered as a shared resource, in that it can be shared between the multiple data engine cores 130. In such instances, the same mechanism can be used to change the use of particular memory regions within the TCM 230, with the relevant control signal being routed from the SCFU 270 via the control logic 210 to the memory control logic within the TCM 230.

In one embodiment, when the allocated shared resource includes a region of memory, the data engine core 130 can be arranged to execute management instructions which perform dynamic run-time management of that region of memory. For example, in one embodiment a software-defined FIFO may be implemented within the region of memory, where the extent of the FIFO is defined by a head pointer and a tail pointer. The SCFU 270 may be arranged to act upon instructions to configure that software FIFO, to cause data to be loaded into that software FIFO, to cause data to be saved from that software FIFO to memory, to query the head pointer, to set the tail pointer, etc. Such functions allow for dynamic runtime management of the memory efficiently through use of the SCFU 270 and the control logic 210 in the data engine subsystem 100.

In one embodiment, the allocated shared resource and the data engine core 130 operate concurrently with each other, and hence can simultaneously be performing respective operations without knowledge of each other's state. The sequence of instructions being executed by the data engine may be such that at particular points in time it is necessary to ensure that the activities of the allocated shared resource have been synchronised with the activities of the data engine core prior to that instruction being executed. In one embodiment of the present invention, this can be achieved by arranging the SCFU 270 to act upon a synchronisation instruction to cause synchronisation to occur between the allocated shared resource and the data engine core. Such synchronisation instructions may be explicit or implicit. An example of an explicit synchronisation instruction is where following a DMA start instruction to cause a shared resource in the form of a DMA engine to initiate a DMA transfer, a DMA done instruction is executed. Each of the instructions in the instruction set acted upon by the SCFU 270 cause a flag to be returned to indicate if the instruction was executed successfully, and hence these instructions are viewed from the data engine core's perspective as returning unconditionally. For the DMA done instruction, a flag will only be returned when the control logic 210 within the data engine subsystem 100 has determined that the required DMA transfer has completed. Until such time that the flag is returned, the data engine core 130 will stall, this causing a synchronisation between the allocated shared resource (in this example the DMA logic) and the data engine core, since it is only when the DMA transfer has completed that the data engine core 130 will proceed to execute the next instruction.

As an alternative to such an explicit synchronisation instruction, the synchronisation instruction may be implicit. Again, considering the example of a DMA transfer performed by a shared resource in the form of DMA logic, a DMA start instruction executed to initiate the DMA transfer may also specify arrange a range of addresses to be subject to that DMA transfer. This range of addresses can be seen as specifying a bound condition which will in one embodiment cause the control logic 210 within the data engine subsystem 100 to set a semaphore. This will cause the data engine core 130 to stall if it tries to execute an instruction requiring access to one of the data addresses within that range. Only when the DMA transfer has completed, and accordingly the semaphore has been cleared, will the data engine core 130 then be able to continue execution of that instruction, thereby forcing a synchronisation to take place.

Such synchronisation instructions can also be used to ensure that the activities of the various elements of the data processing apparatus relying on a particular configuration of the data engine subsystem 100 are synchronised prior to that configuration changing. As mentioned earlier, the main processing unit 20 may change the configuration of the data engine subsystem between sessions. If the main processing unit indicates a new configuration for the data engine subsystem, then a synchronisation instruction can be executed to cause a synchronisation point to be reached where the allocated shared resource(s) and the data engine 60 are synchronised, such that the new configuration is only effected within the data engine subsystem after the synchronisation point has been reached. This ensures correct operation of the data processing apparatus when transitioning between one configuration of the data engine subsystem and another.

If during a session change concurrent processes are still active in the data engine subsystem (working lower in the OSI hierarchy), then these are only aborted or reset in dependence of the specific requirements of the session change. For example on an accepted synchronization point, a codec related parameter may be changed, for which it is not necessary to abort the output stream, which is effectively continuous. On another change, the input file may be switched, which does require the output stream to be aborted as well. Hence, in summary, processes are only reset if needed.

The earlier-mentioned bound conditions that may be specified by particular instructions acted upon by the SCFU 270 can also be used by the data engine compiler used to schedule the sequence of instructions for execution by the data engine core 130, with the aim of improving the efficiently with which the data engine core 130 can execute those instructions. In particular, the compiler can be arranged, on encountering an instruction that sets a bound condition, to analyse the bound condition and to schedule execution of subsequent instructions in the sequence having regard to the bound condition. For example, if the bound condition specifies a range of memory addresses to be subjected to one or more operations specified by the instruction setting that bound condition, then the compiler can be arranged to reorder the immediately following instructions with the aim of finding a number of immediately following instructions which do not require access to any of the addresses set by the bound condition. This hence will reduce the chance that the data engine core 130 will need to stall when executing the sequence of instructions, and accordingly can improve the speed and efficiency of the data engine core.

It is possible that when a particular task is to be undertaken by the data engine core 130, the actual resources required to perform that task are not yet available. To deal with such a scenario, the SCFU 270 can be arranged to issue a control signal to the control logic 210 to cause the task to be scheduled for execution, rather than immediately executed. Hence, taking the example of the DMA start instruction, this can be performed directly if the required resources are available, or in the case that the shared resource is not yet available, the task associated with the DMA start instruction can be added to a queue by the control logic 210, such that the required task is started when the resource becomes available.

In some embodiments, one of the shared resources can be a communications transfer element coupling the data engine 60 with another processing device, be that another data engine, the host processor 20, etc. In such an embodiment, the SCFU 270 can be used to synchronise communications and processing between the associated data engine core 130 and that other processing unit. This mechanism can hence, for example, be used to achieve synchronisation between the data engine core 130 and that other processing unit, thus for example providing a mechanism for performing thread synchronisation akin to the type of thread synchronisation that can be performed as an operating system function.

Figure 4:
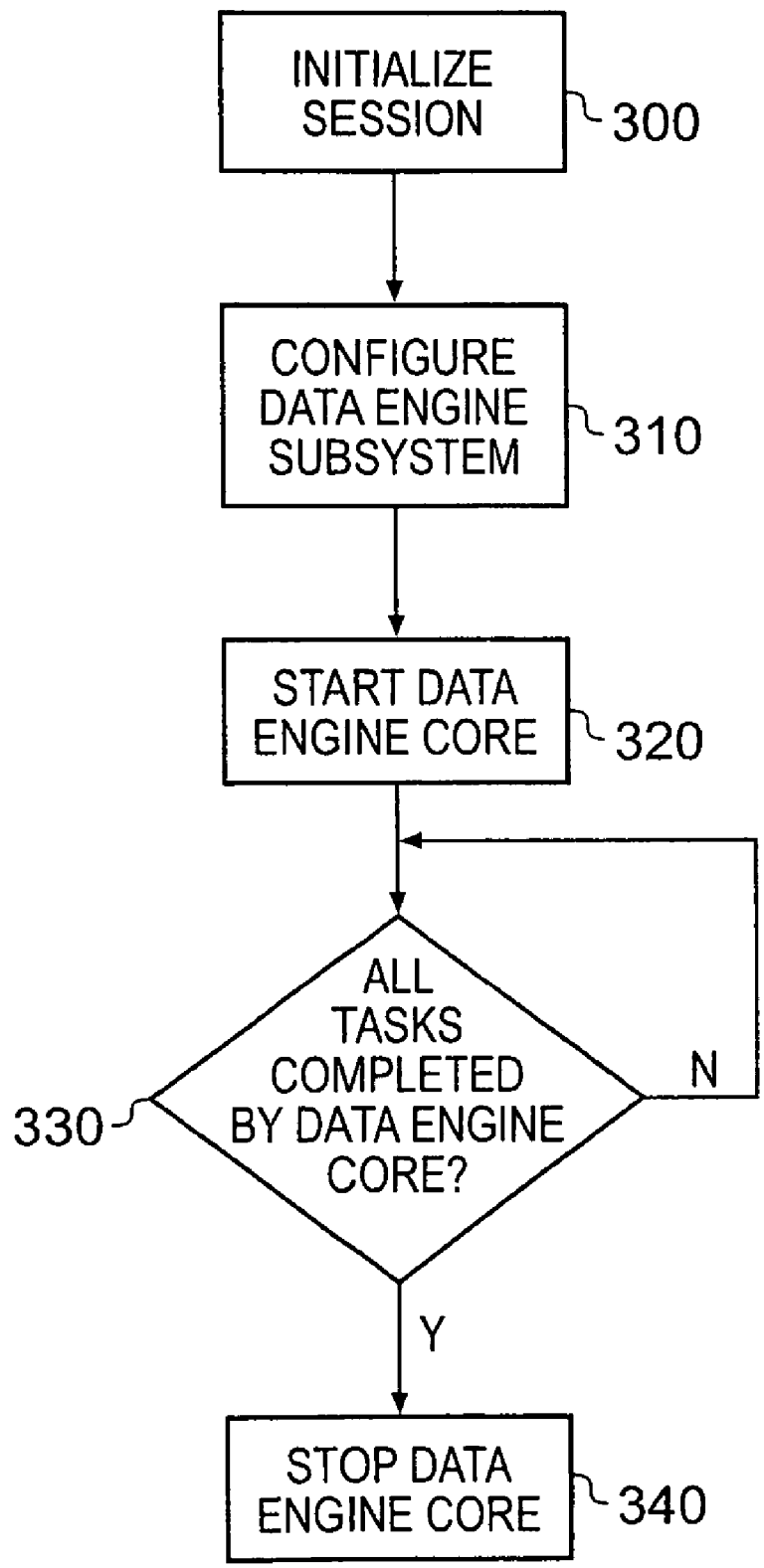
FIG. 4 is a flow diagram illustrating steps performed by the data processing apparatus when initialising a session, in order to cause certain tasks to be executed by a data engine of one embodiment of the present invention.

FIG. 4 is a flow diagram illustrating steps performed with respect to the data engine 60 when initialising a session. At step 300, the session is initialised by the host processor 20, whereafter at step 310 the host processor 20 is arranged to configure the data engine subsystem 100 by issuing appropriate configuration data to the configuration port 202 of the data engine subsystem 100. In this embodiment, the data engine core 130 is then configured explicitly through the data engine subsystem. Once the configuration has taken place, the data engine core 130 can be started at step 320 in order to begin processing of the sequence of tasks allocated to the data engine core by the host processor. When it is subsequently determined at step 330 that all of those allocated tasks have been completed by the data engine core, then the data engine core can be stopped at step 340. It should be noted that whilst all of the allocated tasks within a particular session are being performed by the data engine core, the configuration of the data engine subsystem does not change.

Figure 5:
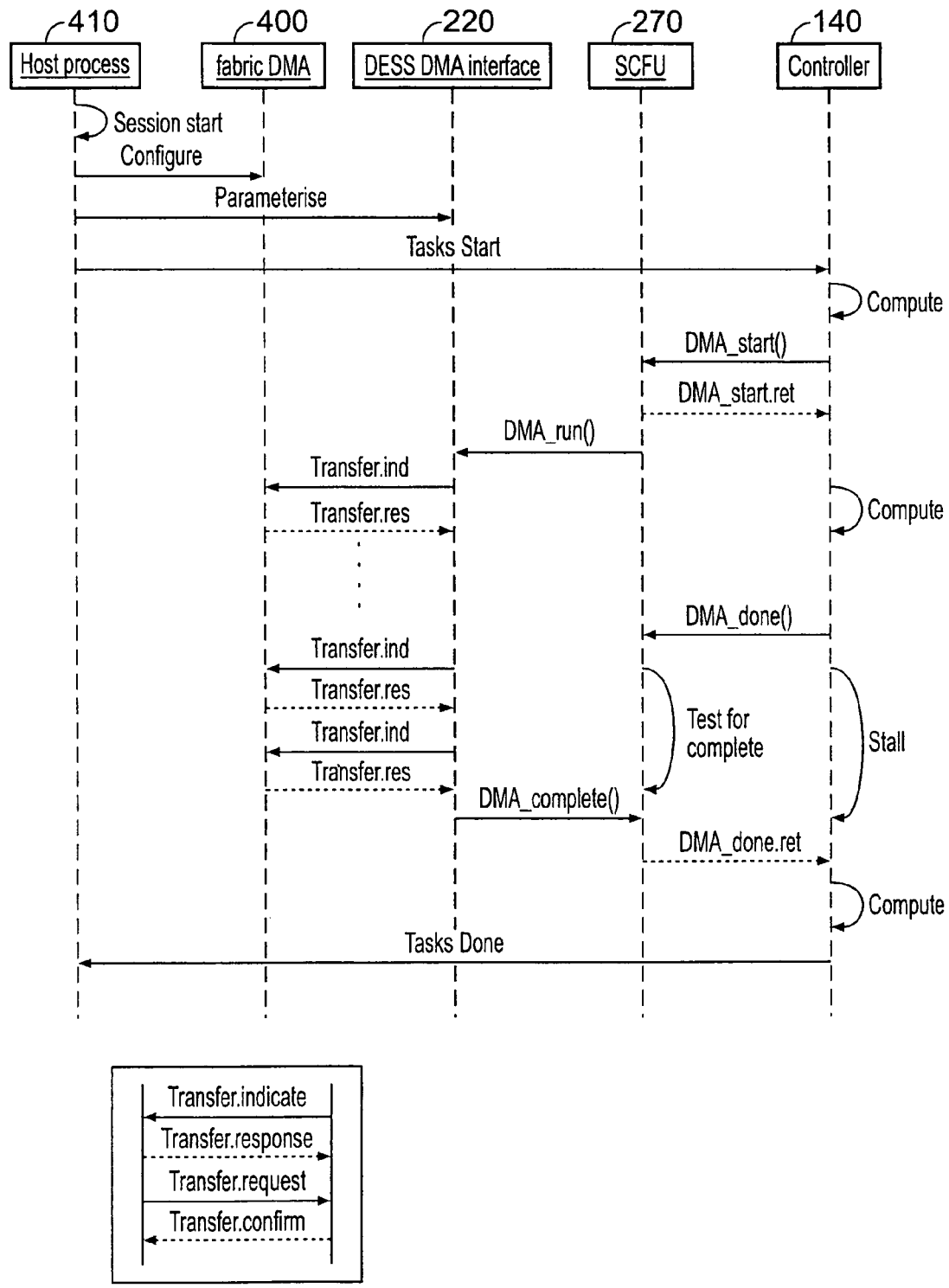
FIGS. 5 to 9 are transaction diagrams illustrating various transactions taking place between the host processor, data engine and shared resources of particular embodiments of the present invention.

FIG. 5 is a transaction diagram illustrating transactions occurring between various elements of the data processing apparatus when the data engine core initiates a DMA transfer task. Firstly, a host process 410 executing on the host processor 20 causes a session to start, whereafter the host process issues a transaction to the DMA logic 400 (one of the shared resources 50 of FIG. 1) to configure that DMA for use by the data engine 60. Additionally, the host process initiates a transaction to the data engine subsystem 100 to cause the DMA interface 220 therein to be configured appropriately to enable the data engine core to communicate with the DMA logic 400. In FIG. 5, this process is referred to as parameterisation, generally this process involving the configuration of the data engine subsystem 100 for the particular session in question.

Once this configuration takes place, the host process will access the controller 140 of the data engine core 130 via its configuration port 142 in order to load the sequence of instructions associated with the required tasks in to program memory, whereafter the host process 410 can start the required tasks by communicating with the controller 140 via its associated control port 143. This will typically cause a number of computations to be performed by the associated data path 150 and at some point this may result in the execution of a DMA start instruction. On executing this instruction, the controller 140 contacts the SCFU 270 to cause the transfer of a DMA run command via the control logic 210 to the DMA interface 220 within the data engine subsystem. It should be noted that the SCFU 270 also at this time returns a DMA start return flag to the controller 140 to indicate that the DMA start instruction has been actioned. The controller 140 requires the return of this flag to enable it to continue execution of further instructions and resultant routing of control signals to appropriate functional units within the data path 150.

When the DMA run command is received by the DMA interface 220, it will issue a transfer indicate signal to the DMA logic 400 indicating that it is supplying data which it wishes the DMA to transfer. In association with this transfer indicate signal, the actual data will be output to the DMA logic 400. For example, with reference to FIG. 3, this data may be data that is being routed from the TCM 230 to some memory device in the external environment. When the DMA accepts this block of data, it issues a transfer response signal back to the DMA interface 220, this signal basically acknowledging that the data has been accepted, and indicating that the DMA 400 is available to receive further blocks of data. Each block of data to be transferred will involve the exchange of a transfer indicate signal and associated transfer response signal between the DMA interface 220 and the DMA logic 400.

In the example of FIG. 5, it is assumed that the controller 140 continues during this period to run through the sequence of instructions, and at some point reaches a DMA done instruction which on execution causes the SCFU 270 to communicate with the control logic 210 to determine whether the DMA process has been completed. However, completion of the DMA process will only be indicated once the DMA interface 220 has returned a DMA complete signal to the control logic 210 and SCFU 270. Accordingly, during this period, it is not possible to return a DMA done return flag to the controller 140, and accordingly the controller 140 stalls, as shown in FIG. 5.

Only once the DMA transfer has completed, and the appropriate DMA complete signal has been returned to the SCFU 270, can the SCFU 270 issue a DMA done return flag to the controller 140, whereafter the controller 140 can continue its operation. At some point once all of the allocated tasks have been completed, the controller 140 will issue a "Tasks Done" signal to the host process 410.

Figure 6:
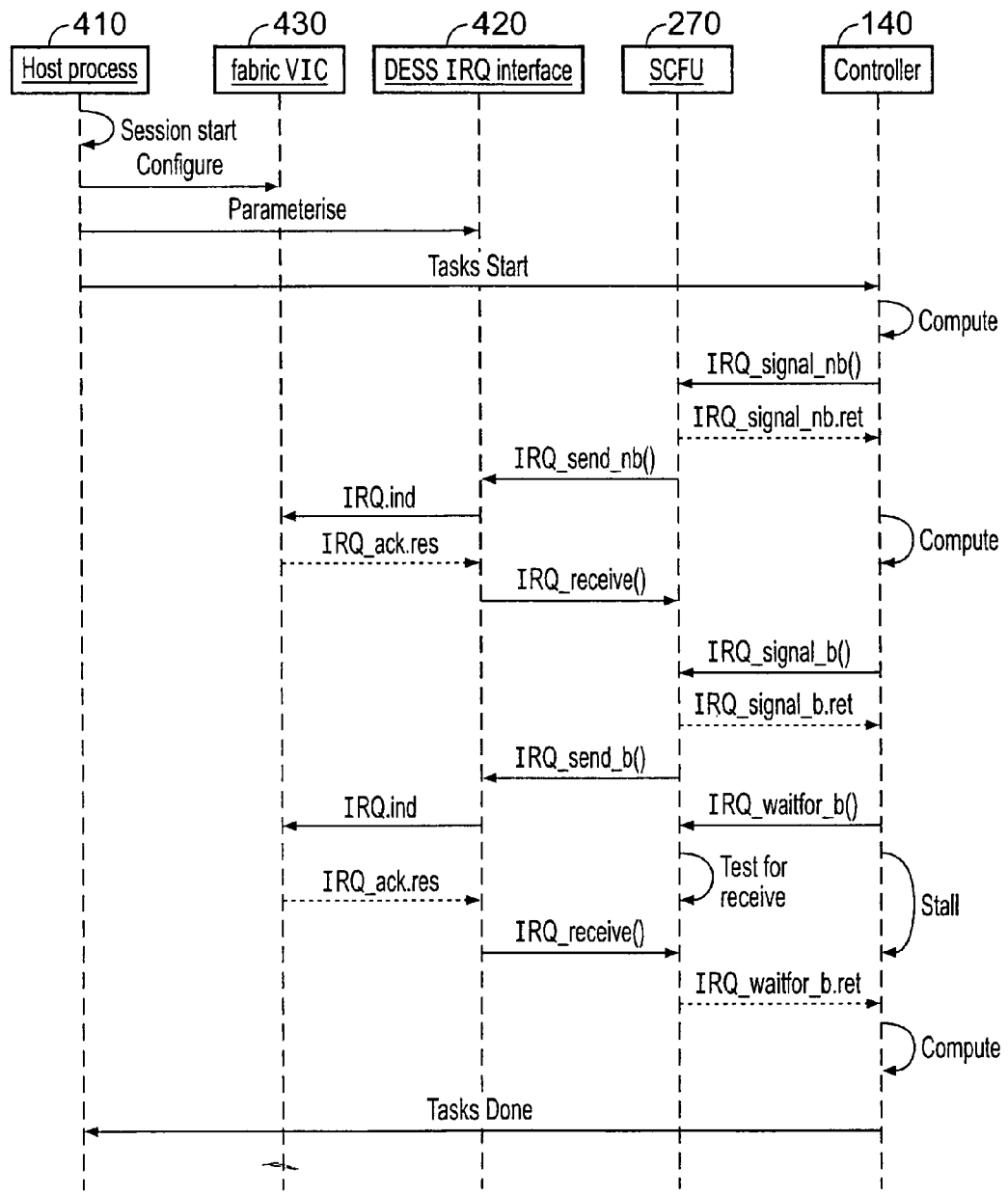

FIG. 6 is a transaction diagram illustrating another example of a process that may be implemented on the data processing apparatus of an embodiment of the present invention making use of the SCFU 270. In this example, the shared resource of relevance is a VIC 430. In the same way as discussed earlier with reference to FIG. 5, when the host process 410 starts a session, it will configure the shared resource, in this case the VIC 430 and also cause configuration of the data engine subsystem 100, in this case the relevant component being the interrupt interface 420, which can be considered to reside within the control logic 210. When the tasks to be run by the data engine core 130 are then started, the controller 140 will start executing the sequence of instructions and dispatching corresponding control signals to the relevant functional units of the data path 150. When it reaches a point where an interrupt is required, it will execute an interrupt signal generation instruction causing a corresponding control signal to be routed to the SCFU 270. The SCFU will then send a return flag to the controller 140 to allow the controller 140 to continue execution, and also will issue an interrupt send command to the interrupt interface 420 within the data engine subsystem 100. This will cause an interrupt signal to be output to the VIC 430 from the data engine subsystem, resulting in an interrupt acknowledgement response signal being returned from the VIC 430 to the interrupt interface 420 to indicate acceptance of the interrupt by the VIC. An interrupt receive signal will then be passed on via the control logic 210 to the SCFU 270 to identify that the interrupt has been accepted.

Meanwhile the controller 140 continues execution, and at some subsequent point requires generation of a blocking interrupt, such a blocking interrupt being used as a synchronisation type of instruction where the controller 140 will stall execution until it knows that the interrupt has been accepted by the VIC 430. In particular, as shown, even though the flag is returned from the SCFU 270 following receipt of the blocking interrupt signal, this merely results in the controller 140 executing a further instruction (IRQ_waitfor_b( )) causing the SCFU 270 to check in consultation with the control logic 210 whether the interrupt has been acknowledged by the VIC 430.

Meanwhile, the receipt by the SCFU 270 of the control signal associated with the original interrupt signal blocking instruction will have caused the SCFU to route to the interrupt interface 420 an interrupt send command, which in turn will have caused an interrupt indication to be routed to the VIC 430. When the VIC 430 subsequently acknowledges receipt of that interrupt, this will cause an ack response to be returned to the interrupt interface 420, which in turn will cause an interrupt receive signal to be returned via the control logic 210 to the SCFU 270. Only on receipt of this receive signal can the SCFU 270 return the flag in response to the IRQ_waitfor_b( ) instruction previously executed by the controller 140. Furthermore, only when this flag has been returned to the controller 140 can the controller 140 exit its stall state and continue execution.

In one embodiment, an ID is included in association with the various interrupt signals issued in FIG. 6, so that when more than one interrupt is in the process of being handled at any point in time, the individual signals can be correlated to a particular one of those interrupts.

Figure 7:
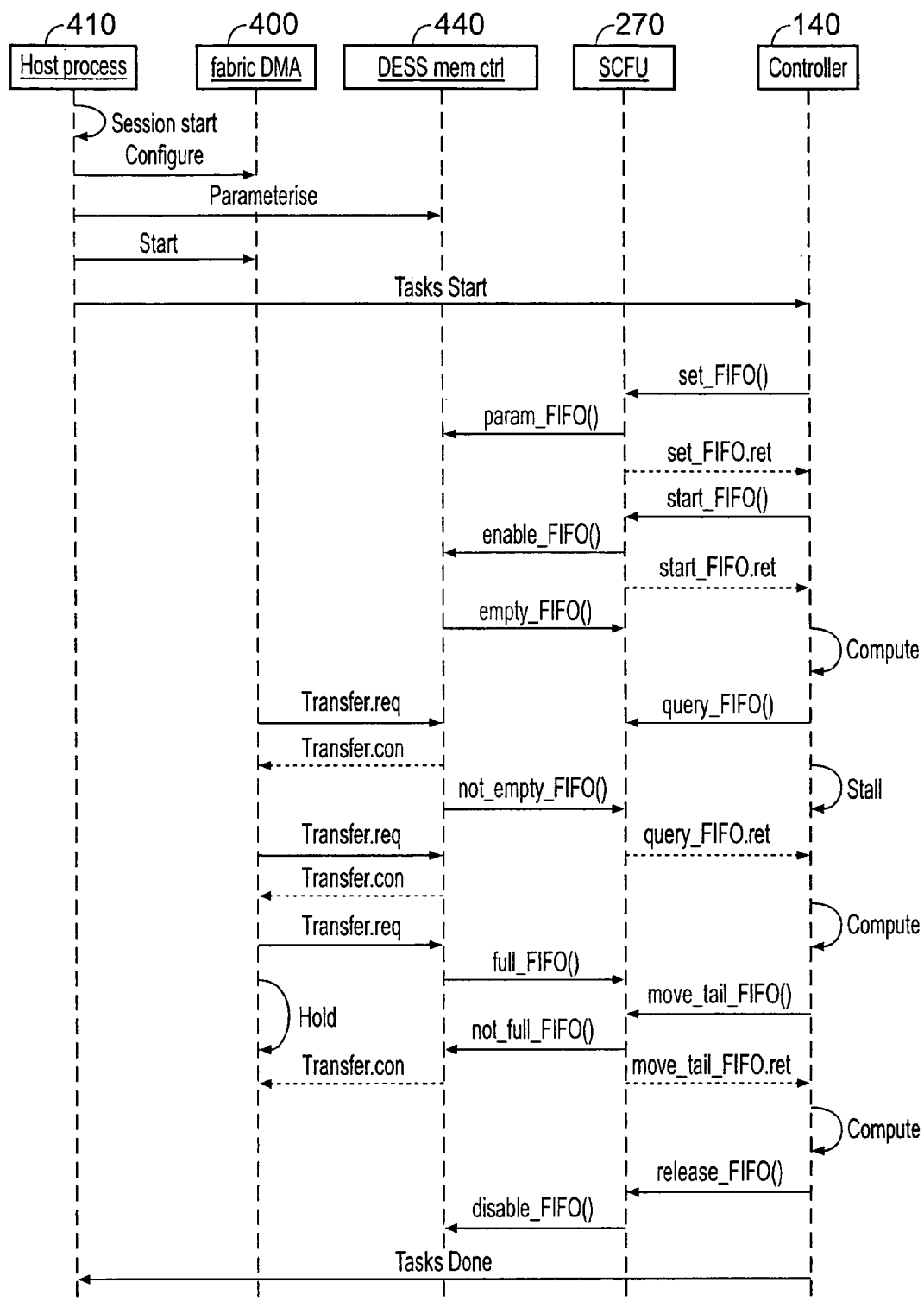

FIG. 7 is a further example of tasks that can be performed on the data processing apparatus 10 of one embodiment employing use of the SCFU 270. In this case, the shared resources comprise both DMA logic 400 and some shared memory controlled by a memory controller 440. In the particular example in question, it is assumed that multiple data engine cores share the same data engine subsystem, and hence a memory resource such as the TCM 230 within the data engine subsystem is shared between multiple data engine cores. Hence in this example, the memory controller 440 can be considered to reside within the TCM 230 of FIG. 3.

When the session starts, the DMA logic 400 and memory controller 440 are configured in a similar manner to that discussed earlier with reference to FIGS. 5 and 6. In this example, it is assumed that data is to be transferred from the external environment via the DMA logic 400 into the TCM memory 230, and in particular into a software FIFO maintained within the TCM 230. Accordingly, the DMA 400 is started, and thereafter the tasks are dispatched to the controller 140. This will cause the controller 140 to execute a set FIFO instruction, as a result of which the SCFU 270 will be caused to issue a control command to the memory controller 440 providing some parameters defining the FIFO to be set up within the memory. Also a set FIFO return flag is returned to the controller 140, whereafter a start FIFO instruction is executed, this causing an enable FIFO command to be sent from the SCFU 270 to the memory controller 440. Again, a return flag is returned to the controller 140.

Periodically, the memory controller 440 will send status information to the SCFU 270 indicating the status of the FIFO, for example whether it is empty, not empty, or full. Further, at some point during execution of the sequence of instructions, the controller will cause a query FIFO instruction to be executed resulting in a query signal being routed to the SCFU 270, with the return flag being returned to the controller 140 once the next piece of status is provided to the SCFU from the memory controller 440. During the intervening period, the controller 140 will stall as shown in FIG. 7.

As shown in FIG. 7, once the DMA logic 400 has been started, and the FIFO has been enabled, blocks of data will be transferred between the DMA logic 400 and the TCM 230, with the relevant control signals being routed between the DMA logic 400 and the associated memory controller 440. Hence, a transfer request signal from the DMA logic 400 will be accompanied by the data being transferred, and the memory controller 440 will send a transfer confirm signal back to the DMA logic 400 when it receives that data.

At some stage, the continued transfer of data via the DMA logic 400 into the FIFO provided within the TCM 230 will result in the FIFO becoming full, which will be indicated to the SCFU 270 by the issuance of a full FIFO signal from the memory controller 440 to the SCFU 270. At this point, any further data that the DMA logic 400 is seeking to transfer cannot be accepted by the TCM, as indicated by the hold loop shown in FIG. 7.

Meanwhile, instructions being executed on the data engine core will make use of the data in the FIFO, and at some point certain parts of that data in the FEFO will no longer be required. At this point, the controller 140 will execute a move tail FIFO instruction, which will cause the SCFU 270 to issue a control signal to the memory controller 440 indicating that the FIFO is no longer full (i.e. no longer is full of data that is still required by the data engine core). At this point the memory controller 440 can accept the data the subject of a pending transfer request from the DMA logic 400, and accordingly return the required transfer confirm signal hence bringing to an end the hold process being executed on the DMA logic 400.

When the control signal is issued to the memory controller 440 from the SCFU 270 indicating that the FIFO is no longer full, a move tail FIFO return flag is also returned to the controller 140 to enable the controller to continue execution.

At some point, the data engine core 150 will have no further use for the software FIFO set up within the TCM 230, and accordingly the controller 140 can be arranged to execute a release FIFO instruction, which in turn causes a disable FIFO control signal to be routed from the SCFU 270 to the memory controller 440.

Figure 8:
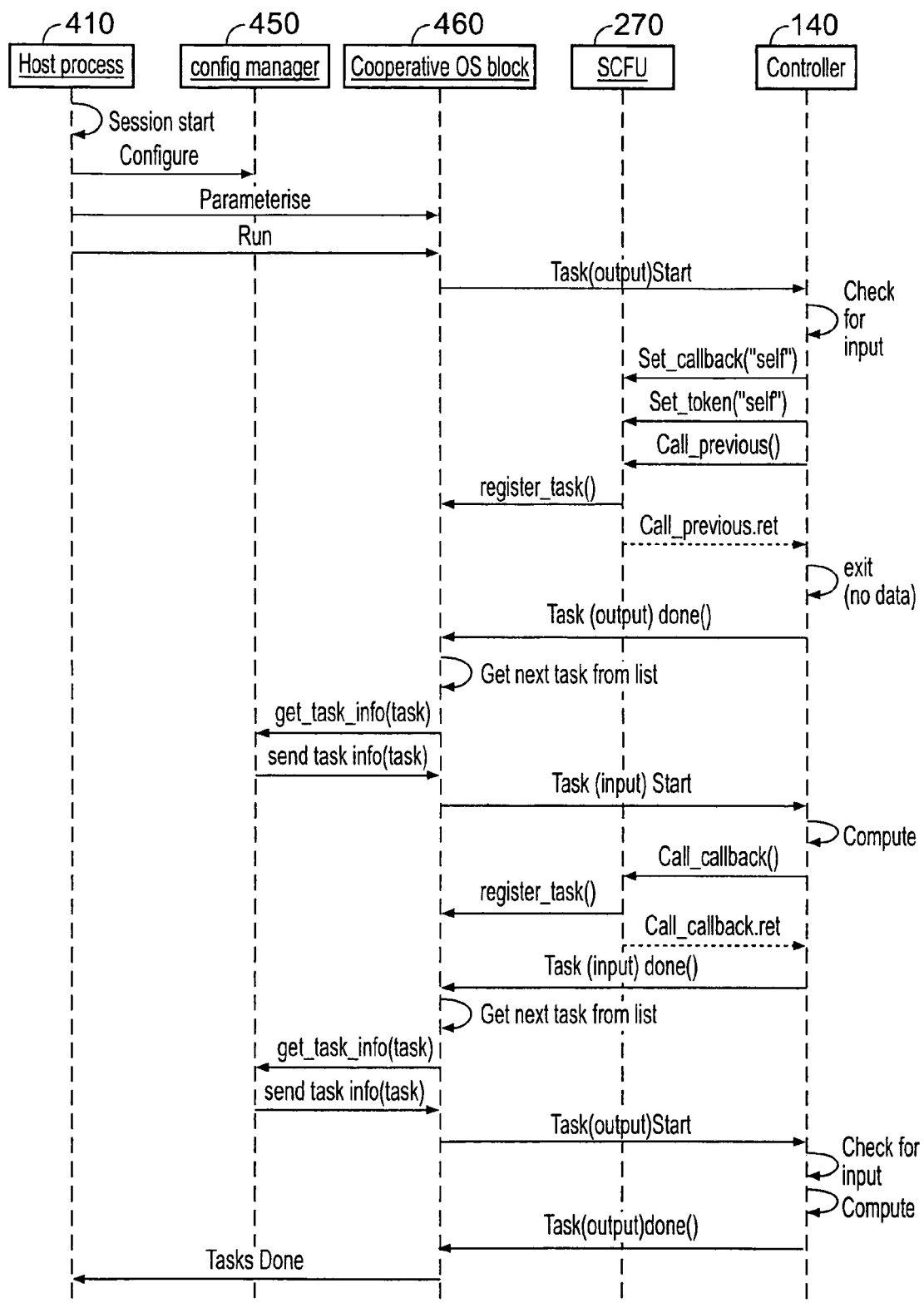

FIG. 8 is a transaction diagram illustrating another example of a process that may be implemented on the data processing apparatus of an embodiment of the present invention making use of the SCFU 270. In particular, in accordance with this example, the controller 140 within the data engine core 130 can be arranged when executing a current function/task to call a predecessor function/task, with the current function being automatically called back after completion of that predecessor function. The configuration manager 450 illustrated in FIG. 8 will typically reside in the control logic 210 of the data engine subsystem 100 shown in FIG. 3, and will provide an interface at the session layer which is used to maintain the state of a session. Similarly, the co-operative operating system (OS) block 460 shown in FIG. 8 can be viewed as residing within the control logic 210, and is used to control the scheduling of tasks.

As shown in FIG. 8, the host process 410 executing on the host processor 20 causes a session to start, whereafter the host process issues a transaction to the configuration manager 450 to configure the configuration manager. Additionally, the host process initiates a transaction to the co-operative OS block of the data engine subsystem 100 to configure/parameterise that block for the particular session in question.

Once this configuration has taken place, the host process 410 issues a run command to the co-operative OS block 460 to indicate that the data engine can now begin processing tasks. At this point, the co-operative OS block 460 will determine a first task to be performed by the data engine core, and will output a task start command to the controller 140 identifying that task. In example illustrated in FIG. 8, this task is an output task, such as would be used in order to cause the data engine core to generate some output data. At this point, the controller 140, in association with the data path logic 150 as appropriate, will determine whether the data engine core 130 has the required input data to enable it to perform the output task.

In the example illustrated in FIG. 8, it is determined that the required input data is not currently present, and at this point, the controller 140 executes a set callback instruction in order to issue a set callback control signal to the SCFU 270 identifying itself as a parameter of the callback instruction. In addition, a set token instruction is executed in order to issue a set token control signal to the SCFU 270, again identifying itself as a parameter of that instruction. The set callback control signal will cause the SCFU to issue a control command to the data engine subsystem identifying that the controller 140 should be called back when the data required for the output task is available, and the set token control signal causes the SCFU to issue information identifying how to contact that particular controller 140, for example which communication channel to use, etc. However, in the example illustrated in FIG. 8, this information is bundled by the SCFU 270 with other information required as a result of execution of a call previous instruction by the controller 140. Execution of the call previous instruction will cause the SCFU to determine the previous task (ie the one preceding the output task) and to then issue a register task command to the co-operative OS block 410 within the data engine subsystem 100 identifying that previous task. The presence of the callback request, and the associated token information, will also be bundled into this register task command returned to the co-operative OS block 460.

Receipt of the register task command by the co-operative OS block 460 will cause the previous task to be registered with the co-operative OS block, along with an indication that on completion of that previous task a callback operation is required to the controller 140.

As shown in FIG. 8, when the call previous instruction is acted upon by the SCFU 270, this will cause a call previous return flag to be returned to the controller 140, on receipt of which the controller 140 is able to exit the output task and return a task done command to the co-operative OS block 460.

On receipt of the task done command from the controller 140, the co-operative OS block 460 seeks to obtain the next task from a list of tasks that it maintains. Since no intervening tasks have been registered, the next task obtained from the list will be that task registered as the result of the register task command discussed earlier, ie the task preceding the output task. The co-operative OS block 460 will then issue the get task info command to the configuration manager 450 in order to obtain information about the task, resulting in a send task info command being returned from the configuration manager 450 to the co-operative OS block 460 incorporating the necessary information.

Thereafter, the co-operative OS block 460 can issue a task start command to the controller 140 identifying that task, which in this instance is an input task. This will cause a number of computations to be performed by the associated data path in order to obtain the required input data. Since at the time this current task being executed had been registered with the co-operative OS block 460, a callback request had also been associated with that task, then on completion of the necessary computations required by that task, the controller 140 will be arranged to execute a call callback instruction causing a call callback control signal to be routed to the SCFU identifying as parameters a token identifying the controller 140 as the recipient for the task allocated as a result of this callback operation. The call callback control signal will cause the SCFU to issue a register task command to the co-operative OS block 460 identifying the relevant token, and this will cause the co-operative OS block 460 to register a task with that associated token. Also, on issuing the register task command, a call callback flag will be returned to the controller 140 from the SCFU, whereafter the controller can issue a task done command to the co-operative OS block 460.

On receipt of the task done command, the co-operative OS block 460 then obtains the next task from the list, this being a task identifying the controller 140 as the recipient by virtue of the token information, and then as before the co-operative OS block 460 will communicate with the configuration manager 450 in order to obtain the necessary details of that task. The task required will be the task following the input task, which will be the earlier-mentioned output task. Accordingly, that output task is routed to the controller 140 via a task start command, the earlier mentioned token identifying that this command should be sent to this particular controller. At this point, the controller checks for input, but this time the input is available, and accordingly the necessary computations required by the output task can then be performed. On completion of the output task, a corresponding task done signal is then returned to the co-operative OS block 460, and if this is the last task in the session allocated to the co-operative OS block, this will cause a tasks done command to be returned to the host process 410.

By the approach illustrated schematically with reference to FIG. 8, the SCFU 270 allows the data engine core to be implemented as a single context minimum overhead processor (for example you cannot interrupt it to do another task for a moment), since the SCFU offers an Application Programming Interface (API) that allows a task to register other tasks with a scheduler part of the operating system. Since that scheduler part of the operating system (which in one embodiment resides within the data engine subsystem 100) is also responsive to system events that lead to system requested tasks being scheduled, the whole system still behaves as standard event driven software is expected to, but the data engine core retains the simplicity of a "single-function-at-a-time" task-level accelerator. This ability offered by the SCFU to allow a task executing on the data engine core to register other tasks with the scheduler part of the operating system will be referred to herein as "task chaining".

It will be appreciated that when employing embodiments which support such task chaining functions, the system programming interface can be arranged to be systematic and object oriented, where sequences of task chains can be configured, which from that point on run in a dynamic autonomous fashion.

When adopting an embodiment such as that shown in FIG. 8, where a co-operative OS block 460 is used to schedule tasks for execution by the data engine core, then it will be appreciated that the earlier described flow diagram of FIG. 4 may be modified. In particular, step 330 of FIG. 4 would be a decision block determining whether all tasks currently allocated to the data engine core have been completed. When those tasks are completed, then an intervening step would in one embodiment be placed between steps 330 and 340, where it is determined whether there are any new tasks pending, this being determined by the co-operative OS block. If there were, then those new tasks would be allocated to the data engine core and the process would return to step 330. However, if it was determined that there were no pending new tasks, then the process would proceed to step 340.

Figure 9:
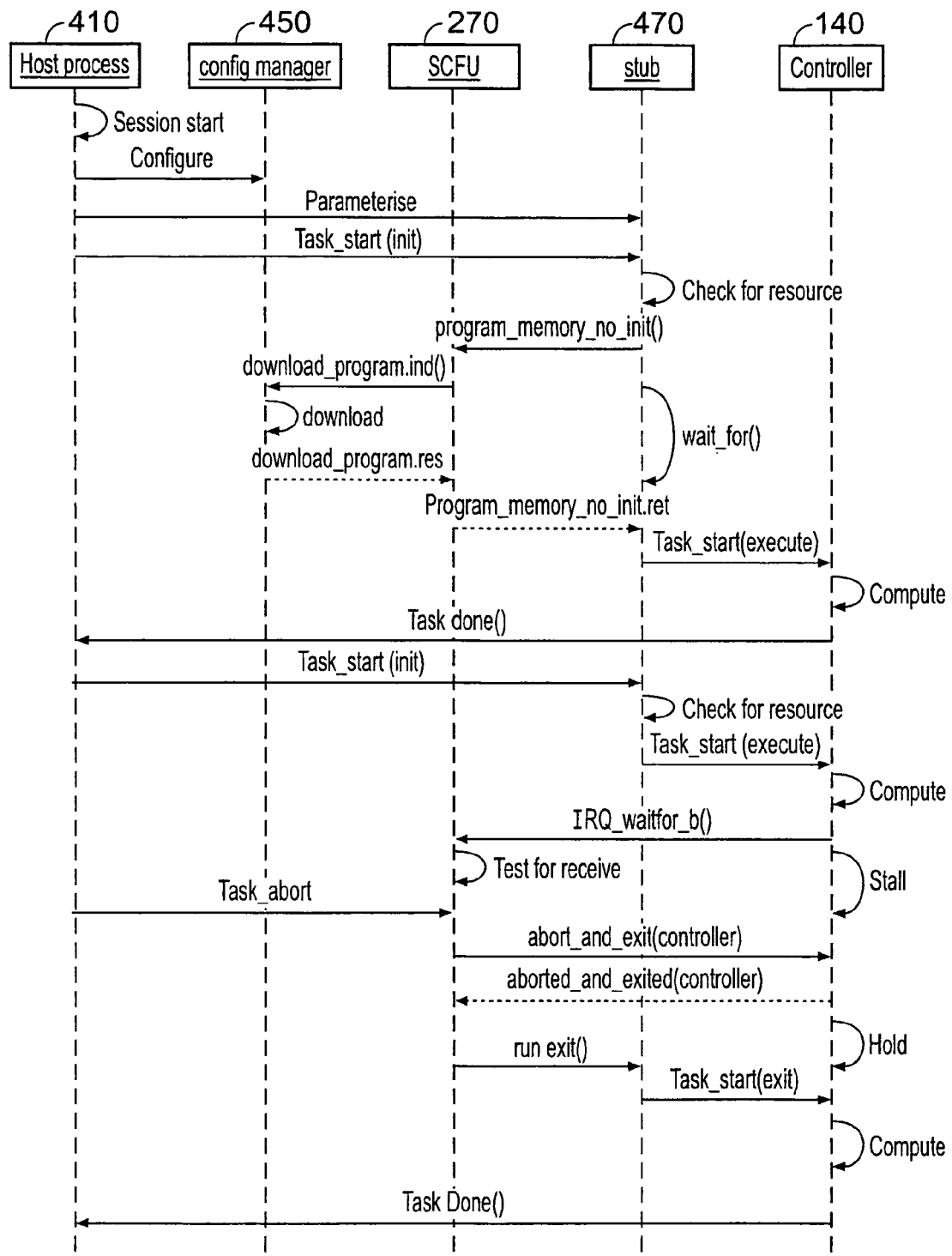

FIG. 9 illustrates a further example of tasks that can be performed on the data processing apparatus of one embodiment employing use of the SCFU 270. In such embodiments, a stub layer 470 is provided within the data engine. In one embodiment, this stub layer 470 can be provided as software executing within the data path 150 of the data engine core 130, whilst in another embodiment the stub layer may be implemented by a mixed hardware and software approach, where in addition to some software executing on the data path 130, some of the functionality of the stub layer is provided within the control logic 210 of the data engine subsystem 100. In contrast to the earlier described examples where the task start command is issued to the controller 140 of the data engine core, in this embodiment, such task start commands are issued to the stub layer 470, which then performs some initial steps before deciding whether to propagate the task start command onto the controller 140.

In particular, as shown in FIG. 9, when a session is started, the host process 410 configures the configuration manager 450, and also issues a parameterise command to the stub layer 470 to configure the stub layer for the particular session. Thereafter, a task start initiate command is issued to the stub layer 470, the stub layer being responsive to receipt of that command to check whether certain resources required for executing that task are available, such resources also being referred to herein as prerequisites. Thus, as an example, the stub layer 470 may test whether all required resources, such as program data, constant table data, state allocations, etc are present. Hence, in general terms, it can be seen that the stub layer 470 is arranged to check whether everything needed for execution of the task is available to the data engine core that is to execute that task.

In the example illustrated in FIG. 9, the stub layer determines that the program memory has not been initialised, and accordingly issues a request signal to the SCFU 270, in this particular example that request signal being a "program memory not initialised" signal. This request signal causes the SCFU 270 to issue a download program indication to the configuration manager 450 to cause the configuration manager to download the necessary program into the required program memory, whereafter a download program response signal is returned to the SCFU 270. This then results in the issuance of a return flag from the SCFU 270 to the stub layer 470. In the intervening period, the stub layer 470 enters a "wait for" loop awaiting receipt of the return flag. Upon receipt of the return flag, the stub layer 470 then knows that all required resources for the task are available, and accordingly issues the task start command to the controller 140 to cause the task to be executed. This results in a series of computations, and on completion of the task, a task done command is sent from the controller 140 to the host process 410.

On receipt of the task done command, the host process 410 can then issue another task start command to the stub layer 470. In the example illustrated in FIG. 9, when the stub layer 470 then checks for resources, it determines that all resources are available, and accordingly issues the task start command to the controller 140, to cause the required computations to be performed. At some point during that computation, the controller 140 may issue a blocking interrupt, for example to cause a synchronisation step to take place. As discussed earlier with reference to FIG. 6, the controller 140 may issue an IRQ_waitfor_b( ) signal to the SCFU 270, causing the SCFU 270 to check in consultation with the control logic 210 whether a previously issued blocking interrupt has been acknowledged by the interrupt controller handling that interrupt. Whilst awaiting that confirmation, the SCFU 270 continues to test for the receipt of that interrupt, and the controller 140 stalls.

In the example of FIG. 9, some event occurs causing a task abort command to be issued from the host process 410 to the SCFU 270 whilst this receipt for the blocking interrupt is awaited. In this instance, the task abort command is sent directly to the SCFU 270, since the software executing on the data engine, including the stub layer 470, is stalled awaiting the response from the blocking interrupt. On receipt of the task abort command by the SCFU, the SCFU is arranged to cause an abort and exit command to be issued to the controller 140 which causes the controller to abort and exit its current process, and send an acknowledgement to that effect to the SCFU 270. On receipt of that acknowledgement, the SCFU 270 then issues a run exit command to the stub layer 470, which is now no longer stalled and can accordingly initiate an exit procedure by sending a task start command to the controller 140 identifying an exit routine. The controller 140 will then in association with the data path 150 execute the desired computations for the exit routine, following which a task done command will be returned to the host process 410.

From the discussion of FIG. 9, it will be seen that the stub layer 470 can enable the implementation of a generalised task model on the data engine. In particular, a task allocated from the host process to the data engine now no longer merely contains an execution part. Instead, the execution part is now only one of several methods incorporated in the task, such as initiate (the constructor), exit (the destructor), save_state, restore_state, etc. The stub layer forms a software layer, which in one embodiment takes the form of a minimal resident program. The SCFU is then able to respond to commands issued by the stub layer 470, as for example discussed earlier with respect to the upper part of FIG. 9. Furthermore, the stub layer can handle exceptions and exit conditions when instructed to do so by the SCFU 270.

The SCFU 270 allows the data engine core to initiate tasks on many resources, and those tasks will potentially run concurrently, depend on the availability and response of shared system resources, and may be modelled as blocking instructions on the data engine side. Due to these factors, an error condition trapped by the host process 410 may result in the data engine core being stalled while waiting for the return of a blocking function, as for example was the case discussed with regards to the lower half of FIG. 9. It is due to this possibility that in the embodiment illustrated in FIG. 9 the SCFU 270 is responsive to soft reset signals from the host process 410, for example the task abort signal illustrated in FIG. 9, which results in the data engine core aborting its blocking instruction and the exit routine of the stub being executed (as was discussed above with regards to the lower part of FIG. 9).

Figure 10:
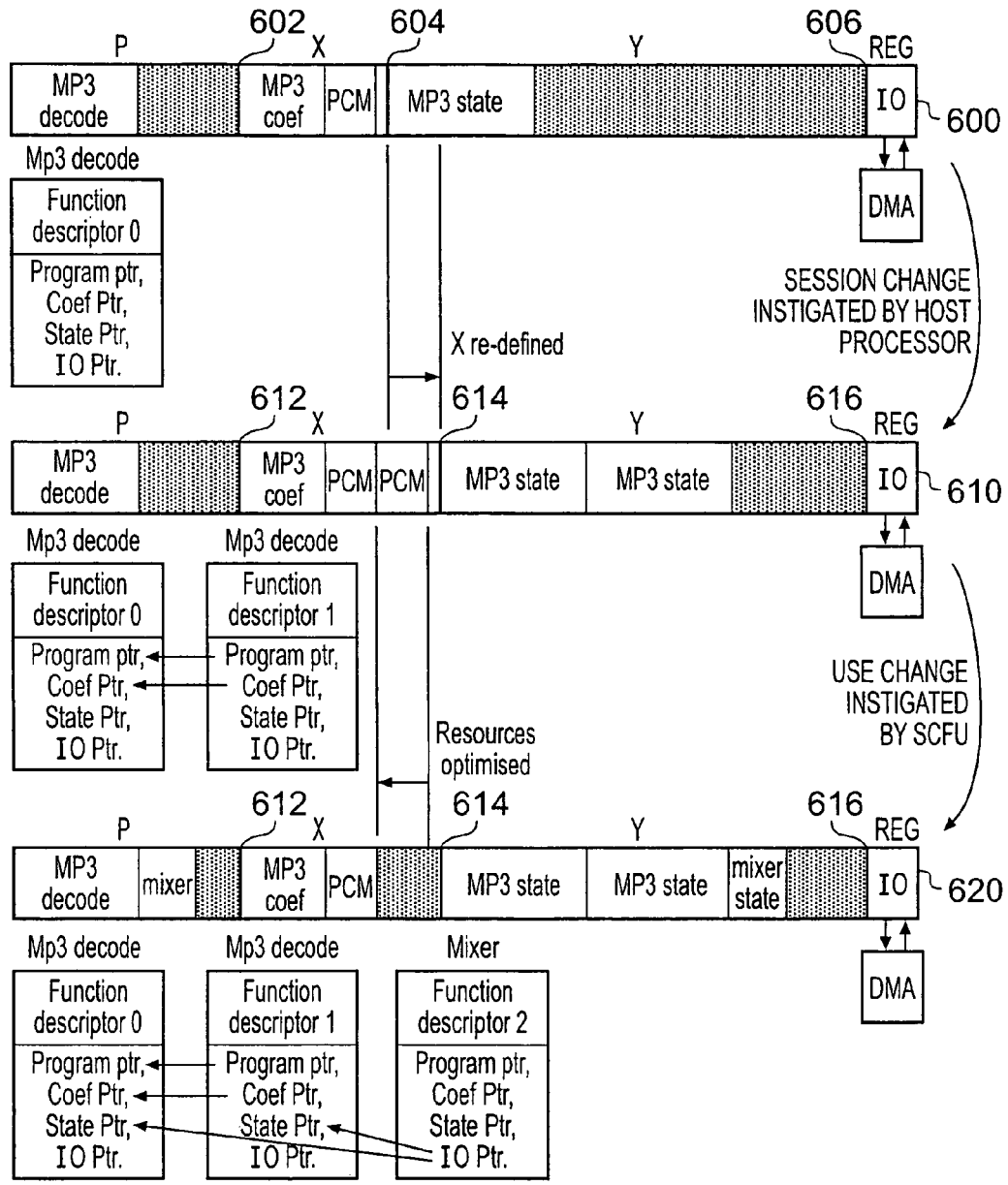
FIG. 10 is a diagram schematically illustrating changes that may be effected within a memory region allocated to a data engine in accordance with one embodiment of the present invention.

FIG. 10 is a diagram schematically illustrating a region of memory that in one embodiment forms a shared resource allocated to the data engine, and in particular indicates two types of change which can be instigated with respect to that memory portion. In particular, when a session is started, the host processor 20 will define boundaries between particular memory regions within that shared memory, and accordingly will define the boundaries 602, 604 and 606 that exist between program (P) memory, two different portions of data memory (referred to as X and Y), and some register memory (as shown in the view 600 of FIG. 10). The register memory is used by DMA logic, and in particular different devices that may use the DMA logic will set particular registers in the DMA register region of memory when they wish to use the DMA logic, and the DMA logic will review the registers in order to determine when it is required to perform DMA transfers.

As shown in FIG. 10, if an MP3 decode function is to be provided, then SCFU 270 can issue appropriate control signals to the memory manager via the control logic 210 to cause different parts of the memory to be allocated for use by the MP3 decode function. In particular, the MP3 decode program instructions can be allocated a particular part of the program memory, certain data such as MP3 coefficients and Pulse Code Modulation (PCM) data can be allocated regions within the X data memory, and MP3 state data can be allocated a region within the Y data memory.

If at some point, a second instantiation of the MP3 decoder is required, then this requires a portion of X data memory to be allocated for further PCM data, and also a portion of the Y data memory to be allocated for MP3 state data associated with the second MP3 decoder. However, as the existing boundaries 602, 604 defining the X data memory leave insufficient space for such PCM data to be allocated, this requires the session manager of the host processor to change the session, this resulting in the new boundaries 612, 614, 616 as illustrated in the view 610 of FIG. 10. Now the additional PCM data region in the X data memory and the MP3 state region in the Y data memory can be defined.

If subsequently a mixer function is also instantiated, then this requires a region of program memory to be allocated to the mixer program instructions, and also a portion of the Y data memory to be allocated for mixer state. Since typically the outputs from MP3 decoders will be mixed prior to further outputs being generated, it is no longer necessary to have two PCM regions within the X data region. As shown by the view 620 in FIG. 10, the change of use between the view 610 and the view 620 can be effected by causing the SCFU 270 to act upon appropriate management instructions to enable dynamic runtime management of the memory, and in particular to establish the mixer region in the program memory and the mixer state region in the Y data memory, along with the freeing up of the second PCM region in the X data memory. It should be noted that in this case the boundaries 612, 614 and 616 set up by the host processor do not change.

Whilst in the above discussion of embodiments of the present invention, a main processing unit has been described as connected to a single layer of one of more data engines, it is also possible to arrange a number of data engines in a hierarchical manner. For example, the main processing unit can present itself to a higher level of hierarchy as a data engine. In such a scenario, it would have a resource manager unit (SCFU) which interacts with the subsystem that connects it to a higher level main processing unit. The top level main processing unit is most likely a general purpose CPU, but any intermediate main processing units could be data engines. The data engines can also be general purpose CPUs, or only the cores of those CPUs. In this regard, the distinction between a main processing unit and its data engines is that the main processing unit controls the shared resources at startup. The data engines can only use shared resources that were allocated to them by the main processing unit.

From the above description of embodiment of the present invention, it will be seen that the data engine synchronizes to actions activated through the SCFU in one of a number of ways:
  it stalls until the action is finished;
  it issues another command that will stall until the first action is finished;
  it issues a command to request the status of the previous command (started, finished, error, . . . );
  it writes status bits directly to specified locations in a status register file accessible by the controller of the data engine core, allowing conditional jumps to act on them immediately; or
  it stalls when a task ends, until actions assigned to the task have finished.

From the above description of embodiments of the present invention, it will be appreciated that embodiments of the present invention can be arranged to exhibit the following features:
  The data engine subsystem can be managed on a session level, and resources allocated to the DESS at the session level;
  The resources can be used locally during the session with the goal of minimising system activity, hence improving performance and reducing energy consumption; and
  The system programming interface can be systematic, object oriented, where sequences of tasks/function chains can be configured, which from that point on run in a dynamic autonomous fashion.

From the above description of embodiments of the present invention, it will be appreciated that such embodiments provide a particularly efficient implementation of a data engine, which is particularly cost effective through the use of shared resource(s), and which also reduces the likelihood that software needs to be re-written for execution on a data processing apparatus including such a data engine, through the provision of the SCFU logic which can cause the data engine core to act as master device with respect to the data engine subsystem to manage use of the allocated shared resource(s).

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:
1. A data processing apparatus comprising:
  a main processing unit configured to perform a plurality of data processing tasks;
  a data engine configured to perform a number of said data processing tasks on behalf of the main processing unit;
  at least one shared resource allocated to the data engine by the main processing unit for use by the data engine when performing said number of data processing tasks;
  the data engine comprising a data engine core configured to perform said number of data processing tasks, and a data engine subsystem configured by the main processing unit to manage communication between the data engine core and said allocated shared resource;
  the data engine core comprising a resource manager unit configured to act as a master device with respect to the data engine subsystem for managing use of the allocated shared resource, wherein the number of data processing tasks to be performed by the data engine comprise a sequence of instructions, including at least one instruc- tion of an instruction set executable by the data engine core to cause said resource manager unit to act as said master device, upon execution of said at least one instruction the resource manager unit is configured to issue a control command to the data engine subsystem to thereby manage use of the allocated shared resource.

2. A data processing apparatus as claimed in claim 1, wherein the data engine subsystem comprises control logic circuitry configured to receive the control command from the resource manager unit and to control use of the allocated shared resource dependent on that control command.

3. A data processing apparatus as claimed in claim 1, wherein the instruction set executable by the data engine core comprises at least one transfer initiation instruction which when executed causes the resource manager unit to act as said master device.

4. A data processing apparatus as claimed in claim 1, wherein the allocated shared resource and the data engine core operate concurrently with each other, and the instruction set executable by the data engine core comprises at least one synchronisation instruction which when executed causes a synchronisation to occur between the allocated shared resource and the data engine core.

5. A data processing apparatus as claimed in claim 4, wherein when the main processing unit indicates a new configuration for the data engine subsystem, the data engine core is configured to execute one of said synchronisation instructions in order to cause a synchronisation point to be reached where the allocated shared resource and the data engine are synchronised, and the new configuration is only effected within the data engine subsystem after the synchronisation point is reached.

6. A data processing apparatus as claimed in claim 1, wherein the data engine core comprises data path logic circuitry consisting of a plurality of functional units, one of said functional units being the resource manager unit, the data engine core further comprising a controller configured to control, for each instruction in the sequence, which functional unit acts upon that instruction.

7. A data processing apparatus comprising:
a main processing unit configured to perform a plurality of data processing tasks;
a data engine configured to perform a number of said data processing tasks on behalf of the main processing unit;
at least one shared resource allocated to the data engine by the main processing unit for use by the data engine when performing said number of data processing tasks;
the data engine comprising a data engine core configured to perform said number of data processing tasks, and a data engine subsystem configured by the main processing unit to manage communication between the data engine core and said allocated shared resource;
the data engine core comprising a resource manager unit configured to act as a master device with respect to the data engine subsystem for managing use of the allocated shared resource, wherein the number of data processing tasks to be performed by the data engine comprise a sequence of instructions, including at least one instruction of an instruction set executable by the data engine core to cause said resource manager unit to act as said master device, upon execution of said at least one instruction the resource manager unit is configured to issue a control command to the data engine subsystem to thereby manage use of the allocated shared resource, the data processing apparatus further comprising:
a data engine compiler configured to schedule said sequence of instructions for execution by the data engine core, wherein the instruction set executable by the data engine core comprises at least one bound instruction identifying a bound condition, the compiler configured, on encountering one of said bound instructions, to schedule execution of subsequent instructions in the sequence having regard to the bound condition.

8. A data processing apparatus comprising:
a main processing unit configured to perform a plurality of data processing tasks;
a data engine configured to perform a number of said data processing tasks on behalf of the main processing unit;
at least one shared resource allocated to the data engine by the main processing unit for use by the data engine when performing said number of data processing tasks;
the data engine comprising a data engine core configured to perform said number of data processing tasks, and a data engine subsystem configured by the main processing unit to manage communication between the data engine core and said allocated shared resource;
the data engine core comprising a resource manager unit configured to act as a master device with respect to the data engine subsystem for managing use of the allocated shared resource, wherein the resource manager unit is configured as a data transfer controller synchronised with the data engine.

9. A data processing apparatus as claimed in claim 8, wherein the allocated shared resource comprises DMA logic circuitry, and the resource manager unit is configured to act as a DMA master device to initiate a transfer of data using said DMA logic circuitry.

10. A data processing apparatus comprising:
a main processing unit configured to perform a plurality of data processing tasks;
a data engine configured to perform a number of said data processing tasks on behalf of the main processing unit;
at least one shared resource allocated to the data engine by the main processing unit for use by the data engine when performing said number of data processing tasks;
the data engine comprising a data engine core configured to perform said number of data processing tasks, and a data engine subsystem configured by the main processing unit to manage communication between the data engine core and said allocated shared resource;
the data engine core comprising a resource manager unit configured to act as a master device with respect to the data engine subsystem for managing use of the allocated shared resource, wherein the allocated shared resource comprises an interrupt controller, and the resource manager unit is configured to issue an interrupt for routing via the data engine subsystem to the interrupt controller.

11. A data processing apparatus comprising:
a main processing unit configured to perform a plurality of data processing tasks;
a data engine configured to perform a number of said data processing tasks on behalf of the main processing unit;
at least one shared resource allocated to the data engine by the main processing unit for use by the data engine when performing said number of data processing tasks;
the data engine comprising a data engine core configured to perform said number of data processing tasks, and a data engine subsystem configured by the main processing unit to manage communication between the data engine core and said allocated shared resource;
the data engine core comprising a resource manager unit configured to act as a master device with respect to the data engine subsystem for managing use of the allocated shared resource, wherein the number of data processing tasks to be performed by the data engine comprise a sequence of instructions, including at least one instruction of an instruction set executable by the data engine core to cause said resource manager unit to act as said master device, upon execution of said at least one instruction the resource manager unit is configured to issue a control command to the data engine subsystem to thereby manage use of the allocated shared resource, and wherein the allocated shared resource comprises a region of memory, and the instruction set executable by the data engine core comprises at least one management instruction to enable dynamic runtime management of the region of memory.

12. A data processing apparatus comprising:
a main processing unit configured to perform a plurality of data processing tasks;
a data engine configured to perform a number of said data processing tasks on behalf of the main processing unit;
at least one shared resource allocated to the data engine by the main processing unit for use by the data engine when performing said number of data processing tasks;
the data engine comprising a data engine core configured to perform said number of data processing tasks, and a data engine subsystem configured by the main processing unit to manage communication between the data engine core and said allocated shared resource;
the data engine core comprising a resource manager unit configured to act as a master device with respect to the data engine subsystem for managing use of the allocated shared resource, wherein the number of data processing tasks to be performed by the data engine comprise a sequence of instructions, including at least one instruction of an instruction set executable by the data engine core to cause said resource manager unit to act as said master device, upon execution of said at least one instruction the resource manager unit is configured to issue a control command to the data engine subsystem to thereby manage use of the allocated shared resource and wherein the instruction set executable by the data engine core comprises at least one scheduling instruction which when executed causes a task to be scheduled for execution by the allocated shared resource.

13. A data processing apparatus comprising:
a main processing unit configured to perform a plurality of data processing tasks;
a data engine configured to perform a number of said data processing tasks on behalf of the main processing unit;
at least one shared resource allocated to the data engine by the main processing unit for use by the data engine when performing said number of data processing tasks;
the data engine comprising a data engine core configured to perform said number of data processing tasks, and a data engine subsystem configured by the main processing unit to manage communication between the data engine core and said allocated shared resource;
the data engine core comprising a resource manager unit configured to act as a master device with respect to the data engine subsystem for managing use of the allocated shared resource, wherein the number of data processing tasks to be performed by the data engine comprise a sequence of instructions, including at least one instruction of an instruction set executable by the data engine core to cause said resource manager unit to act as said master device, upon execution of said at least one instruction the resource manager unit is configured to issue a control command to the data engine subsystem to thereby manage use of the allocated shared resource, and wherein the instruction set executable by the data engine core comprises at least one registering instruction which when executed whilst the data engine core is performing a first data processing task causes a second data processing task to be registered for execution.

14. A data processing apparatus comprising:
a main processing unit configured to perform a plurality of data processing tasks;
a data engine configured to perform a number of said data processing tasks on behalf of the main processing unit;
at least one shared resource allocated to the data engine by the main processing unit for use by the data engine when performing said number of data processing tasks;
the data engine comprising a data engine core configured to perform said number of data processing tasks, and a data engine subsystem configured by the main processing unit to manage communication between the data engine core and said allocated shared resource;
the data engine core comprising a resource manager unit configured to act as a master device with respect to the data engine subsystem for managing use of the allocated shared resource, wherein the number of data processing tasks to be performed by the data engine comprise a sequence of instructions, including at least one instruction of an instruction set executable by the data engine core to cause said resource manager unit to act as said master device, upon execution of said at least one instruction the resource manager unit is configured to issue a control command to the data engine subsystem to thereby manage use of the allocated shared resource, and wherein the instruction set executable by the data engine core comprises at least one callback instruction, if the data engine core determines whilst performing a first data processing task that at least one condition for performance of that task is not satisfied, the data engine core is configured to execute the callback instruction to cause the resource manager unit to identify to the data engine subsystem that the first data processing task should be re-invoked once said at least one condition is satisfied, thereby allowing the data engine core to terminate performance of the first processing task until the at least one condition is satisfied.

15. A data processing apparatus comprising:
a main processing unit configured to perform a plurality of data processing tasks;
a data engine configured to perform a number of said data processing tasks on behalf of the main processing unit;
at least one shared resource allocated to the data engine by the main processing unit for use by the data engine when performing said number of data processing tasks;
the data engine comprising a data engine core configured to perform said number of data processing tasks, and a data engine subsystem configured by the main processing unit to manage communication between the data engine core and said allocated shared resource;
the data engine core comprising a resource manager unit configured to act as a master device with respect to the data engine subsystem for managing use of the allocated shared resource, wherein the data engine comprises a stub layer which, when a data processing task is to be performed by the data engine core, is configured to check for one or more prerequisites required by that data processing task before allowing the data processing task to be performed by the data engine core, wherein the number of data processing tasks to be performed by the data engine comprise a sequence of instructions, including at least one instruction of an instruction set executable by the data engine core to cause said resource manager unit to act as said master device, upon execution of said at least one instruction the resource manager unit is configured to issue a control command to the data engine subsystem to thereby manage use of the allocated shared resource, and wherein the instruction set executable by the data engine core comprises at least one request instruction, when the stub layer determines that at least one prerequisite required by the data processing task is not satisfied, the request instruction being executed to cause the resource manager unit to output a request command to the data engine subsystem asking for that at least one prerequisite to be satisfied.

16. A data processing apparatus comprising:
a main processing unit configured to perform a plurality of data processing tasks;
a data engine configured to perform a number of said data processing tasks on behalf of the main processing unit;
at least one shared resource allocated to the data engine by the main processing unit for use by the data engine when performing said number of data processing tasks;
the data engine comprising a data engine core configured to perform said number of data processing tasks, and a data engine subsystem configured by the main processing unit to manage communication between the data engine core and said allocated shared resource;
the data engine core comprising a resource manager unit configured to act as a master device with respect to the data engine subsystem for managing use of the allocated shared resource, wherein the data engine comprises a stub layer which, when a data processing task is to be performed by the data engine core, is configured to check for one or more prerequisites required by that data processing task before allowing the data processing task to be performed by the data engine core, wherein the number of data processing tasks to be performed by the data engine comprise a sequence of instructions, including at least one instruction of an instruction set executable by the data engine core to cause said resource manager unit to act as said master device, upon execution of said at least one instruction the resource manager unit is configured to issue a control command to the data engine subsystem to thereby manage use of the allocated shared resource, and wherein the instruction set executable by the data engine core comprises at least one error handling instruction, when at least one prerequisite required by the data processing task cannot be satisfied the error handling instruction being executed to cause the resource manager unit to output any required error condition and cause the data processing task to be exited.

17. A data processing apparatus comprising:
a main processing unit configured to perform a plurality of data processing tasks;
a data engine configured to perform a number of said data processing tasks on behalf of the main processing unit;
at least one shared resource allocated to the data engine by the main processing unit for use by the data engine when performing said number of data processing tasks;
the data engine comprising a data engine core configured to perform said number of data processing tasks, and a data engine subsystem configured by the main processing unit to manage communication between the data engine core and said allocated shared resource;
the data engine core comprising a resource manager unit configured to act as a master device with respect to the data engine subsystem for managing use of the allocated shared resource, wherein the number of data processing tasks to be performed by the data engine comprise a sequence of instructions, including at least one instruction of an instruction set executable by the data engine core to cause said resource manager unit to act as said master device, upon execution of said at least one instruction the resource manager unit is configured to issue a control command to the data engine subsystem to thereby manage use of the allocated shared resource, and wherein at least one instruction in the instruction set executable by the data engine core is arranged to cause the return of a flag to indicate if the instruction was executed successfully, whereby in the absence of the flag the data engine core will stall and enter a power saving mode.

18. A method of operating a data processing apparatus having a main processing unit configured to perform a plurality of data processing tasks, and a data engine configured to perform a number of said data processing tasks on behalf of the main processing unit, the method comprising the steps of:
allocating to the data engine at least one shared resource for use by the data engine when performing said number of data processing tasks;
performing said number of data processing tasks using a data engine core of the data engine;
configuring a data engine subsystem to manage communication between the data engine core and the allocated shared resource; and
employing a resource manager unit within the data engine core to act as a master device with respect to the data engine subsystem for managing use of the allocated shared resource, wherein the number of data processing tasks to be performed by the data engine comprise a sequence of instructions, including at least one instruction of an instruction set executable by the data engine core to cause said resource manager unit to act as said master device, upon execution of said at least one instruction the resource manager unit is configured to issue a control command to the data engine subsystem to thereby manage use of the allocated shared resource.

19. A data engine for a data processing apparatus having a main processing unit configured to perform a plurality of data processing tasks, the data engine is configured to perform a number of said data processing tasks on behalf of the main processing unit, and being allocated at least one shared resource of the data processing apparatus for use when performing said number of data processing tasks, the data engine comprising:
a data engine core configured to perform said number of data processing tasks;
a data engine subsystem configured by the main processing unit to manage communication between the data engine core and the allocated shared resource; and
a resource manager unit within the data engine core configured to act as a master device with respect to the data engine subsystem for managing use of the allocated shared resource, wherein the number of data processing tasks to be performed by the data engine comprise a sequence of instructions, including at least one instruction of an instruction set executable by the data engine core to cause said resource manager unit to act as said master device, upon execution of said at least one instruction the resource manager unit is configured to issue a control command to the data engine subsystem to thereby manage use of the allocated shared resource.

* * * * *